(12) United States Patent
Koh et al.

(10) Patent No.: US 10,061,303 B2
(45) Date of Patent: Aug. 28, 2018

(54) THREE-DIMENSIONAL PRINTING SUPPORT MODELS

(71) Applicant: Autodesk, Inc., San Rafael, CA (US)

(72) Inventors: Naimin Koh, Singapore (SG); Murali Pappoppula, Singapore (SG)

(73) Assignee: Autodesk Inc., San Rafael, CA (US)

( * ) Notice: Subject to any disclaimer, the term of this patent is extended or adjusted under 35 U.S.C. 154(b) by 251 days.

(21) Appl. No.: 15/157,794

(22) Filed: May 18, 2016

(65) Prior Publication Data

US 2017/0336777 A1 Nov. 23, 2017

(51) Int. Cl.
 *G05B 19/00* (2006.01)
 *G05B 19/4099* (2006.01)
 (Continued)

(52) U.S. Cl.
 CPC ......... *G05B 19/4099* (2013.01); *G05B 15/02* (2013.01); *B33Y 50/02* (2014.12);
 (Continued)

(58) Field of Classification Search
 CPC .............. G05B 19/4099; G05B 15/02; G05B 2219/49023; B33Y 50/02
 See application file for complete search history.

(56) References Cited

U.S. PATENT DOCUMENTS 5,595,703 A    1/1997 Swaelens et al.
5,943,235 A *  8/1999 Earl ........................ B29C 41/36
                                                  345/420

(Continued)

FOREIGN PATENT DOCUMENTS

DE    195 07 881 A1    9/1995
DE    601 22 219 T2    8/2007
EP    2 198 405 B1     3/2011

OTHER PUBLICATIONS

Schmidt and Umetani, "Branching Support Structures for 3D Printing," ACM SIGGRAPH 2014 Studio, 2014, retrieved on May 13, 2016 [online] (retrieved from http://dl.acm.org/citation.cfm?id=2656293), 1 page.

(Continued)

*Primary Examiner* — Christopher E. Everett
(74) *Attorney, Agent, or Firm* — Fish & Richardson P.C.

(57) ABSTRACT

Methods, systems, and apparatus, including computer programs encoded on computer storage media, for determining portions of an item that would be unsupported during three-dimensional printing. One of the methods includes obtaining data representing a three-dimensional model of an item to be created by a three-dimensional printer, processing data representing discrete portions of an upper layer of the three-dimensional model that are labelled as unsupported to place supports for at least some of the discrete portions that are labelled as unsupported, processing data representing any remaining discrete portions of the upper layer that are labelled as unsupported and for which a support for the remaining discrete portion would intersect with a lower portion in the three-dimensional model, generating, for each of the discrete portions labelled as a portion at which to generate a support, a support for the discrete portion in the three-dimensional model.

20 Claims, 11 Drawing Sheets

(51) Int. Cl.
  *G05B 15/02* (2006.01)
  *B33Y 50/02* (2015.01)
(52) U.S. Cl.
  CPC .............. *G05B 2219/49023* (2013.01); *G05B 2219/49123* (2013.01); *G05B 2219/50132* (2013.01)

(56) References Cited

U.S. PATENT DOCUMENTS

| | | | |
|---|---|---|---|
| 6,558,606 B1 | 5/2003 | Kulkarni et al. | |
| 7,084,370 B2 | 8/2006 | Hagemeister et al. | |
| 2004/0015254 A1* | 1/2004 | Vancraen | B23Q 3/103 |
| | | | 700/97 |
| 2004/0251581 A1* | 12/2004 | Jang | B22F 3/008 |
| | | | 264/497 |
| 2008/0211124 A1 | 9/2008 | Zagagi et al. | |
| 2009/0072447 A1* | 3/2009 | Hull | B33Y 40/00 |
| | | | 264/401 |
| 2010/0228369 A1* | 9/2010 | Eggers | G06T 17/10 |
| | | | 700/98 |
| 2012/0010741 A1 | 1/2012 | Hull et al. | |
| 2014/0300017 A1* | 10/2014 | Wighton | B29C 67/0092 |
| | | | 264/40.1 |
| 2014/0316549 A1 | 10/2014 | Zenere | |
| 2015/0018995 A1 | 1/2015 | Weitzel et al. | |
| 2015/0066178 A1* | 3/2015 | Stava | B29C 67/0088 |
| | | | 700/98 |
| 2015/0091208 A1* | 4/2015 | Sadusk | B29C 64/40 |
| | | | 264/308 |
| 2015/0151493 A1* | 6/2015 | Schmidt | B29C 67/0092 |
| | | | 700/98 |
| 2015/0360421 A1* | 12/2015 | Burhop | G05B 19/4099 |
| | | | 264/401 |
| 2016/0306901 A1* | 10/2016 | Ainsworth | B33Y 50/00 |

OTHER PUBLICATIONS

Vanek et al., "Clever Support: Efficient Support Structure Generation for Digital Fabrication," Eurographics Symposium on Geometry Processing, 2014, 33(5):117-125.

\* cited by examiner

THREE-DIMENSIONAL PRINTING SUPPORT MODELS

BACKGROUND 3D printing manufacturing systems may enable companies to manufacture products on-demand (sometimes after receiving payment for the product), reduce or eliminate tooling costs, launch new products rapidly, have faster product evolution, reduce product inventory, introduce supply chain simplification and savings, have design and assembly simplification via reduced part count, perform manufacturing locally, reduce shipping and waste, and increase local recycling and material re-use.

SUMMARY

In some implementations, a modelling system receives a three-dimensional (3D) model of an item that will be printed by a 3D printer and determines which discrete portions of the item will be unsupported during printing of the item by the 3D printer. The modelling system may determine support locations for the discrete unsupported portions to minimize intersection of the supports with other discrete portions of the item.

The modelling system may simulate an overhang threshold in the 3D model by generating a cone that extends downward from a discrete portion, e.g., a discrete part of the item, in the 3D model for which the modelling system is analyzing for "unsupportedness." The modelling system may determine an internal angle of the cone using a material of the item, a property of the 3D printer, or both. In some examples, for a fused deposition modeling system, the modelling system may select a cone with a forty-five (45) degree angle.

The modelling system may select a height of the cone using a predetermined number of slices or layers from the 3D model. For instance, the 3D printer may print one slice of the item at a time, e.g., before starting to print a portion of the item above a slice that is currently being printed. In some examples, the modelling system may select a height of one slice as the height of the cone. The modelling system may use any appropriate height for the cone.

The modelling system begins analyzing the discrete portions of the 3D model beginning at the bottom slice of the 3D model, or the slice second from the bottom, e.g., assuming that all portions of the bottom slice are supported by a print bed on which the 3D printer is printing. The modelling system may use only the information about the current slice and a number of slices below the current slice defined by the height of the cone when determining whether a discrete portion in the current slice is supported to reduce an amount of the 3D model currently being analyzed, stored in short term memory, e.g., a random access memory, or both. The number of slices below the current slice defined by the height of the cone, including the current slice, and used to determine whether a discrete portion in the current slice is supported is referred to in this document as a "scan zone."

The modelling system projects the cone from a current discrete portion in the current slice, e.g., a current vertex or a current voxel, using the scan zone. The modelling system checks to see whether the projection of the cone intersects with another portion of the 3D model in the scan zone.

When the modelling system determines that the cone intersects with another portion of the 3D model in the scan zone, the modelling system determines whether the current discrete portion and the portion with which the cone intersects are connected to each other within the scan zone. If the modelling system determines that the current discrete portion is connected in the scan zone to the portion with which the cone intersects, the modelling system labels the current discrete portion as supported. If the modelling system determines that the current discrete portion is not connected in the scan zone to the portion with which the cone intersects, or that the cone does not intersect with another portion of the 3D model, the modelling system labels the current discrete portion as unsupported.

The modelling system may determine, using the 3D model and the discrete portions which are labelled as unsupported, where supports should be positioned when the 3D printer creates the item. For instance, the modelling system may analyze the discrete portions which are labelled as unsupported and determine whether a support specific to that discrete portion would intersect with another portion of the 3D model.

When the modelling system determines that a support for the discrete portion would intersect with another portion of the 3D model, the modelling system temporarily rejects the discrete portion as a portion at which a support should be generated and analyzes another discrete portion. When the modelling system determines that a support for the discrete portion would not intersect with another portion of the 3D model, the modelling system labels the discrete portion as a portion at which to generate a support. The modelling system determines all of the discrete portions within a predetermined distance of the portion and labels the determined discrete portions as supported.

Once the modelling system has determined locations in the 3D model at which to generate supports that will not intersect with other portions of the 3D model, the modelling system determines any remaining unsupported portions and where supports for the remaining portions should be generated.

In general, one innovative aspect of the subject matter described in this specification can be embodied in methods that include the actions of obtaining data representing at least two layers of a three-dimensional model of an item to be created by a three-dimensional printer, wherein discrete portions of at least an upper layer of the three-dimensional model are each labelled as unsupported when a discrete portion is (i) not supported by another portion of an adjacent layer directly below the upper layer and (ii) is not within a predetermined distance of and connected to another of the discrete portions that is supported by another portion of the adjacent layer directly below the upper layer, processing data representing the discrete portions of the upper layer of the three-dimensional model that are labelled as unsupported to place supports for at least some of the discrete portions that are labelled as unsupported, the processing to place supports including: determining, for a discrete portion in the upper layer that is labelled as unsupported, whether a support for the discrete portion would intersect with a lower portion in the three-dimensional model that lies below the upper layer, when the support for the discrete portion would intersect, skipping the discrete portion, and when the support for the discrete portion would not intersect, labelling the discrete portion as a portion at which to generate a support and labelling the discrete portion and any discrete portions that are labelled as unsupported and that lie within a predetermined distance from the discrete portion as supported, processing data representing any remaining discrete portions of the upper layer of the three-dimensional model that are labelled as unsupported and for which a support for the remaining discrete portion would intersect with a lower portion in the three-dimensional model that lies below the upper layer to place additional supports for at least some of the remaining discrete portions that are labelled as unsupported, the processing to place additional supports including labelling a remaining discrete portion as a portion at which to generate a support that would intersect with a lower portion of the three-dimensional model that lies below the upper layer and labelling the remaining discrete portion and any remaining discrete portions that are labelled as unsupported that lie within a predetermined distance from the remaining discrete portion as supported, determining whether a quantity of remaining discrete portions that are labelled as a portion at which to generate a support that would intersect with a lower portion of the three-dimensional model that lies below the upper layer exceeds a threshold value, and when the quantity of remaining discrete portions that are labelled as a portion at which to generate a support that would intersect with a lower portion of the three-dimensional model that lies below the upper layer exceeds the threshold value, providing the three-dimensional model to an another modelling system, and when the quantity of remaining discrete portions that are labelled as a portion at which to generate a support that would intersect with a lower portion of the three-dimensional model that lies below the upper layer does not exceed the threshold value, generating, for each of the discrete portions labelled as a portion at which to generate a support, a support for the discrete portion in the three-dimensional model. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of obtaining data representing at least two layers of a three-dimensional model of an item to be created by a three-dimensional printer, wherein discrete portions of at least an upper layer of the three-dimensional model are each labelled as unsupported when a discrete portion is (i) not supported by another portion of an adjacent layer directly below the upper layer and (ii) is not within a predetermined distance of and connected to another of the discrete portions that is supported by another portion of the adjacent layer directly below the upper layer, processing data representing the discrete portions of the upper layer of the three-dimensional model that are labelled as unsupported to place supports for at least some of the discrete portions that are labelled as unsupported, wherein the processing to place supports includes determining, for a discrete portion in the upper layer that is labelled as unsupported, whether a support for the discrete portion would intersect with a lower portion in the three-dimensional model that lies below the upper layer, when the support for the discrete portion would intersect, skipping the discrete portion, and when the support for the discrete portion would not intersect, labelling the discrete portion as a portion at which to generate a support and labelling the discrete portion and any discrete portions that are labelled as unsupported and that lie within a predetermined distance from the discrete portion as supported, processing data representing any remaining discrete portions of the upper layer of the three-dimensional model that are labelled as unsupported and for which a support for the remaining discrete portion would intersect with a lower portion in the three-dimensional model that lies below the upper layer to place additional supports for at least some of the remaining discrete portions that are labelled as unsupported, the processing to place additional supports including: labelling a remaining discrete portion as a portion at which to generate a support that would intersect with a lower portion of the three-dimensional model that lies below the upper layer and labelling the remaining discrete portion and any remaining discrete portions that are labelled as unsupported that lie within a predetermined distance from the remaining discrete portion as supported, generating, for each of the discrete portions labelled as a portion at which to generate a support for which the support would not intersect with a lower portion of the three-dimensional model, a support for the discrete portion in the three-dimensional model, determining, for each of the discrete portions labelled as a portion at which to generate a support for which the support would intersect with a lower portion of the three-dimensional model, whether an intersection with the three-dimensional model for the support satisfies an intersection threshold, for each discrete portion for which an intersection with the three-dimensional model for the support satisfies the intersection threshold, generating, for the discrete portion, a support in the three-dimensional model between the discrete portion and a portion in the three-dimensional model with which the support intersects without generating the support to contact a print bed, and for each discrete portion for which an intersection with the three-dimensional model for the support does not satisfy the intersection threshold, generating, for the discrete portion, a support in the three-dimensional model between the discrete portion and the print bed. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of determining, for each discrete portion of an upper layer of a three-dimensional model of an item to be created by a three-dimensional printer and using a sub-model of the three-dimensional model that includes the upper layer and a predetermined quantity of layers that lie below the upper layer in the three-dimensional model, whether a shape projected in the sub-model downward from the discrete portion would intersect in the sub-model with a second discrete portion of the sub-model, for each discrete portion of the upper layer for which the shape is determined to intersect in the sub-model with the second discrete portion: determining, using the sub-model, whether the discrete portion of the upper layer is connected in the sub-model to the second discrete portion, in response to determining that the discrete portion of the upper layer is connected in the sub-model to the second discrete portion, labelling the discrete portion as supported, or in response to determining that the discrete portion of the upper layer is not connected in the sub-model to the second discrete portion, labelling the portion as unsupported, and for each discrete portion of the upper layer for which the shape is determined not to intersect in the sub-model with the second discrete portion: labelling the discrete portion as unsupported. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include selecting a width for the supports using at least one of a material of the item or a three-dimensional printer that will create the item using the three-dimensional model. The method may include providing the three-dimensional model to a three-dimensional printer in response to generating, for each of the discrete portions labelled as a portion at which to generate a support, the support for the discrete portion in the three-dimensional model. The method may include selecting the predetermined distance for a circle centered on a particular discrete portion within which any discrete portions that are labelled as unsupported will be labeled as supported when the discrete portion is labelled as supported. Labelling the discrete portion as a portion at which to generate a support may include labelling a portion of a print bed in the three-dimensional model as a portion at which to generate the support.

In some implementations, the method may include, for each upper layer in the three-dimensional model: determining, for each discrete portion of the upper layer and using a sub-model of the three-dimensional model that includes the upper layer and a predetermined quantity of layers that lie below the upper layer in the three-dimensional model, whether a shape projected in the sub-model downward from the discrete portion would intersect in the sub-model with a second discrete portion of the sub-model, for each discrete portion of the upper layer for which the shape is determined to intersect in the sub-model with the second discrete portion: determining, using the sub-model, whether the discrete portion of the upper layer is connected in the sub-model to the second discrete portion, in response to determining that the discrete portion of the upper layer is connected in the sub-model to the second discrete portion, labelling the discrete portion as supported, or in response to determining that the discrete portion of the upper layer is not connected in the sub-model to the second discrete portion, labelling the portion as unsupported, and for each discrete portion of the upper layer for which the shape is determined not to intersect in the sub-model with the second discrete portion: labelling the discrete portion as unsupported. Determining, for each discrete portion of the upper layer and using the sub-model of the three-dimensional model that includes the upper layer and the predetermined quantity of layers that lie below the upper layer in the three-dimensional model, whether the shape projected in the sub-model downward from the discrete portion would intersect in the sub-model with the second discrete portion of the sub-model may include determining, for each discrete portion of the upper layer and using the sub-model of the three-dimensional model that includes the upper layer and the predetermined quantity of layers that lie below the upper layer in the three-dimensional model, whether a cone projected in the sub-model downward from the discrete portion would intersect in the sub-model with the second discrete portion of the sub-model. Determining, for each discrete portion of the upper layer and using the sub-model of the three-dimensional model that includes the upper layer and the predetermined quantity of layers that lie below the upper layer in the three-dimensional model, whether the cone projected in the sub-model downward from the discrete portion would intersect in the sub-model with the second discrete portion of the sub-model may include determining, for each discrete portion of the upper layer and using the sub-model of the three-dimensional model that includes the upper layer and the predetermined quantity of layers that lie below the layer in the three-dimensional model, whether the cone with a predetermined angle and a predetermined height projected in the sub-model downward from the discrete portion would intersect in the sub-model with the second discrete portion of the sub-model, at least one of the predetermined angle or the predetermined height selected based on at least one of a material to be used to create the item using a three-dimensional printing process, a material to be used to create the discrete portion of the item using the three-dimensional printing process, or a three-dimensional printer that will create the item using the three-dimensional model.

In some implementations, determining, for each discrete portion of the upper layer and using the sub-model of the three-dimensional model that includes the upper layer and the predetermined quantity of layers that lie below the upper layer in the three-dimensional model, whether the shape projected in the sub-model downward from the discrete portion would intersect in the sub-model with the second discrete portion of the sub-model may include determining, for each voxel or each vertex of the upper layer and using the sub-model of the three-dimensional model that includes the upper layer and the predetermined quantity of layers that lie below the upper layer in the three-dimensional model, whether the shape projected in the sub-model downward from the voxel or the vertex would intersect in the sub-model with a second voxel or a second vertex in the sub-model, each layer in the three-dimensional model including (i) one or more voxels or (ii) one or more vertices. Determining, for each discrete portion of the upper layer and using the sub-model of the three-dimensional model that includes the upper layer and the predetermined quantity of layers that lie below the upper layer in the three-dimensional model, whether the shape projected in the sub-model downward from the discrete portion would intersect in the sub-model with the second discrete portion of the sub-model may include determining, for each discrete portion of the upper layer and using a sub-model of the three-dimensional model that includes only the upper layer and a single layer in the three-dimensional model that lies below the upper layer and not additional layers, whether the shape projected in the sub-model downward from the discrete portion would intersect in the sub-model with the second discrete portion of the sub-model. Determining, using the sub-model, whether the discrete portion of the upper layer is connected in the sub-model to the second discrete portion may include determining, using only the sub-model, whether the discrete portion of the upper layer is connected in the sub-model to the second portion. Determining, using the sub-model, whether the discrete portion of the upper layer is connected in the sub-model to the second discrete portion may include determining, using the sub-model, a two-dimensional image that includes i) a two-dimensional part of the upper layer, ii) a two-dimensional part of each of the predetermined quantity of layers that lie below the upper layer, iii) a two-dimensional part of the discrete portion of the upper layer, and iv) a two-dimensional part of the second portion, determining each distinct object in the two-dimensional image, and determining whether the discrete portion of the upper layer and the second discrete portion are included in the same object from the two-dimensional image. Labelling, in response to determining that the discrete portion of the upper layer is connected in the sub-model to the second discrete portion, the discrete portion as supported may include, in response to determining that the discrete portion of the upper layer and the second discrete portion are included in the same object from the two-dimensional image, labelling the discrete portion as supported. Labelling, in response to determining that the discrete portion of the upper layer is not connected in the sub-model to the second discrete portion, the portion as unsupported may include, in response to determining that the discrete portion of the upper layer and the second discrete portion are not included in the same object from the two-dimensional image, labelling the discrete portion as unsupported. Determining whether the discrete portion of the upper layer and the second discrete portion are included in the same object from the two-dimensional image may include labelling each object in the two-dimensional image, determining a first label for a first object in the two-dimensional image that includes the discrete portion, determining a second label for a second object in the two-dimensional image that includes the second discrete portion, and determining whether the first label and the second label are the same label.

In some implementations, the method may include projecting, for each discrete portion of the upper layer and using the sub-model of the three-dimensional model that includes the upper layer and the predetermined quantity of layers that lie below the layer in the three-dimensional model, the shape downward from the discrete portion in the sub-model. The method may include providing, to a system, the three-dimensional model and a list of the unsupported portions for support generation for the unsupported portions. A system may include a three-dimensional printer that receives the three-dimensional model and generates the item.

The subject matter described in this specification can be implemented in particular embodiments and may result in one or more of the following advantages. In some implementations, when a modelling system uses a predetermined number of slices of a three-dimensional model, e.g., a scan zone, when checking whether discrete portions of a layer are supported, the modelling system has a maximum limit on an amount of memory used during the check. In some implementations, when a modelling system performs a support check to determine whether a support for a discrete portion of a three-dimensional model will intersect with another portion of the three-dimensional model and places supports that do not intersect before placing supports that would intersection with another portion of the three-dimensional model reduces a number of supports that intersect with other portions of the three-dimensional model, reduces a potential amount of damage to an item when removing supports, or both. In some implementations, a modelling system may perform an "unsupported" check for layers in a three-dimensional model in any arbitrary order, independently for each layer, or both, e.g., based on the assumption that all lower layers will be eventually supported. For instance, this may allow the modelling system to scale up analysis of multiple layers at the same time using multi-core processing systems at the cost of extra memory consumption, or scale down analysis to only use serial processing of a single layer at a time on low end processing systems.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
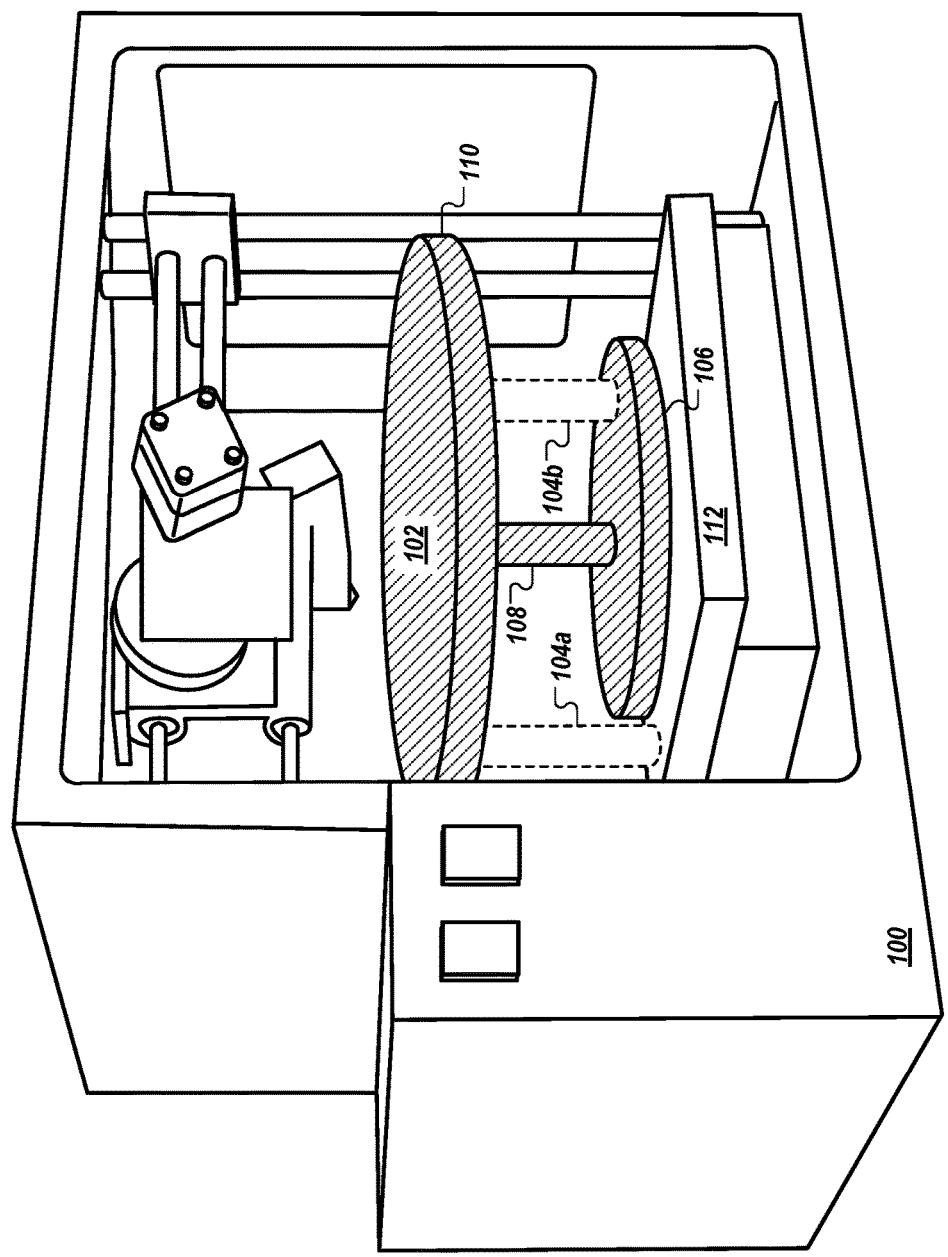
FIG. 1 is an example of a three-dimensional (3D) printer creating an item.

FIG. 1 is an example of a three-dimensional (3D) printer 100 creating an item 102. For example, the 3D printer 100 may create a table 102 using any appropriate printing technology.

During printing, the 3D printer 100 may create supports 104*a-b* to brace portions of the item 102 that may not be otherwise supported during the entire printing process. For instance, when the 3D printer 100 creates a table 102, with a base 106, a center leg 108, and a top 110, the top 110 of the table 102 may not be supported during the entire printing process.

For example, when the 3D printer 100 begins to create the top 110, the top 110 may not be strong enough to hold its own weight, and the 3D printer 100 creates multiple supports 104*a-b* to support the top 110. When the 3D printer 100 finishes printing the top 110, the top 110 is strong enough to support itself and the supports 104*a-b* are no longer needed.

The 3D printer 100, or another system, removes the supports 104*a-b* after the 3D printer 100 has finished creating the table 102. The 3D printer 100 more easily removes a first support 104*a* which connects with the top 110 of the table 102 and a print bed 112 than a second support 104*b* which connects with both the top 110 and the base 106 of the table 102.

To minimize a number of second supports 104*b* that connect with multiple portions of the item 102, e.g., the top 110 and the base 106, a 3D modelling system may first determine support positions for first supports 104*a* which only connect with one surface of the item 102, e.g., the top 110. Once the 3D modelling system determines locations for the first supports 104a and the areas of the item 102 which are held up by the first supports 104a, the 3D modelling system determines locations for the second supports 104b that connect with two or more areas of the item 102, e.g., the top 110 and the base 106.

The 3D modelling system may determine which areas of the item 102 will be supported during the creation of the item 102 and which areas of the item 102 will not be supported. For instance, the 3D modelling system may use a sub-model of the item 102 and analyze areas of the sub-model to determine which areas will be supported and which areas will be unsupported.

Figure 2A:
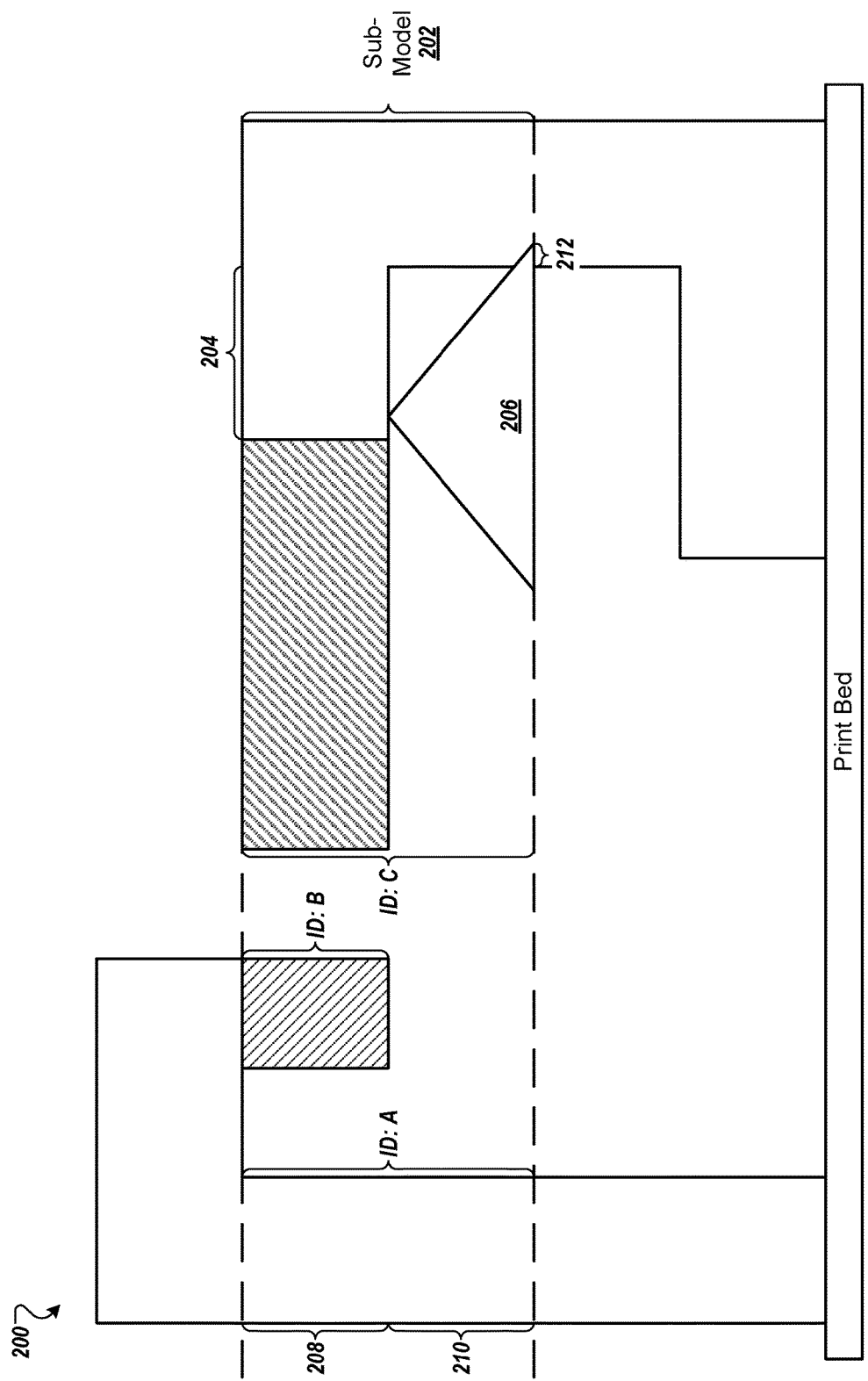
FIGS. 2A-B are an example of a model of an item for use by a three-dimensional (3D) modelling system to label portions of an item as supported and unsupported.
Figure 2B:
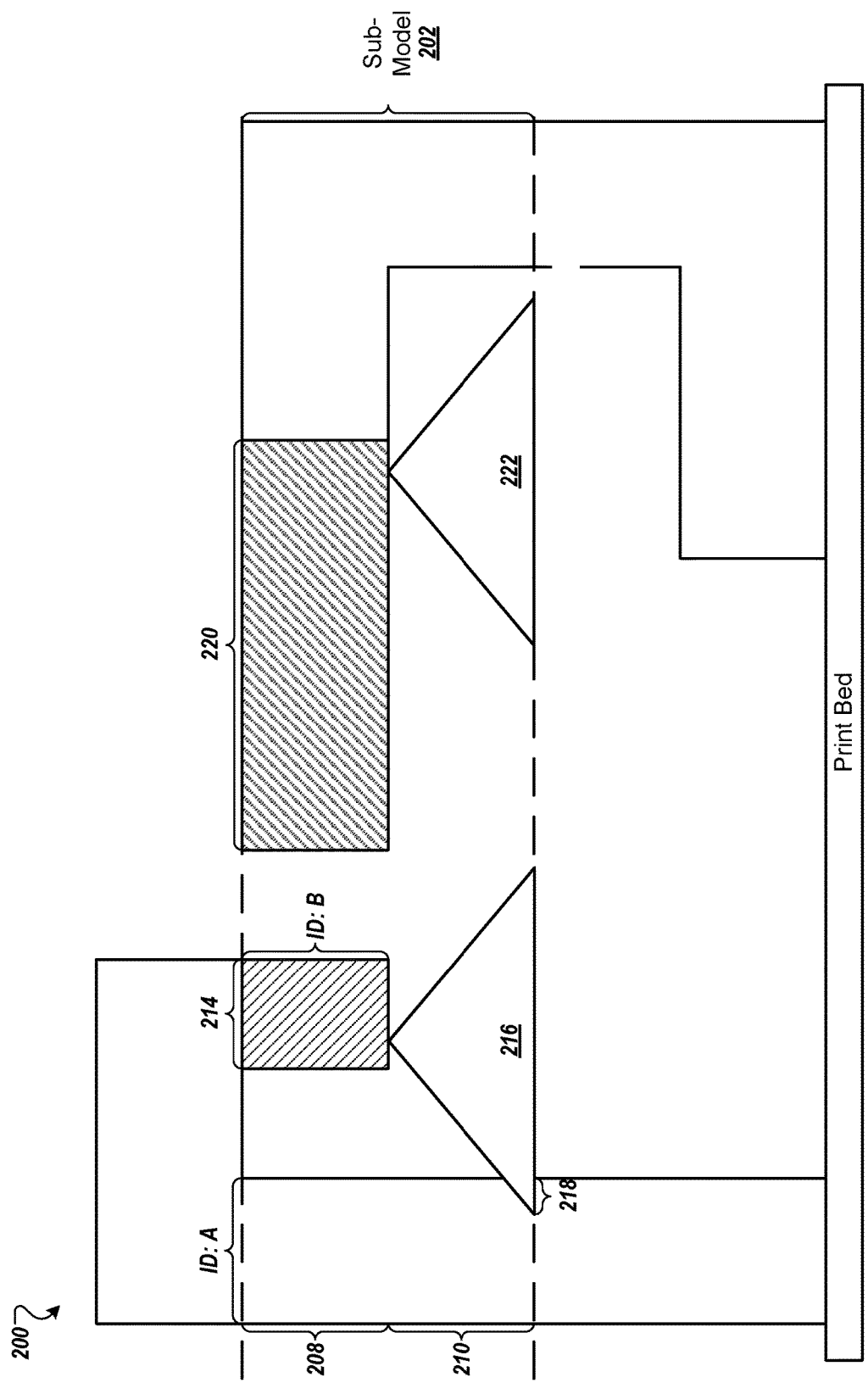

FIGS. 2A-B are an example of a model 200 of an item for use by a three-dimensional (3D) modelling system to label portions of an item as supported and unsupported. For instance, the 3D modelling system may use a 3D model, based on the model 200, of the item to determine which portions of the item are supported and which portions of the item are unsupported and to label the portions based on their supportedness.

As shown in FIG. 2A, the 3D modelling system uses a sub-model 202 of the model 200 to determine whether portions in the sub-model 202 are supported, e.g., to maintain restrictions on an amount of memory required to determine whether the portions are supported or unsupported. For instance, when the 3D modelling system analyzes a current portion 204 of the model 200 to determine whether the current portion 204 is supported, the 3D modelling system only stores data for the sub-model 202, which includes the current portion 204, in a memory.

The sub-model 202 includes two or more slices of the item that will be printed, e.g., when each slice is printed during a pass by a 3D printer, before material for an adjacent higher slice is printed, or both. For instance, the sub-model 202 includes a current slice 208 that includes the current portion 204. The sub-model 202 may include a lower slice 210 that lies directly beneath the current slice 208. In some examples, the sub-model 202 may include multiple lower slices.

The 3D modelling system projects a cone 206 downward from the current portion 204 and in the sub-model 202. The 3D modelling system analyzes the cone 206 to determine whether the cone 206 intersects with another portion 212 of the sub-model 202. The 3D modelling system does not project the cone 206 outside of the sub-model 202, e.g., the entire projection of the cone 206 is maintained within the sub-model 202.

When the 3D modelling system determines that the cone 206 intersects with the other portion 212 of the sub-model 202, the 3D modelling system determines whether the current portion 204 and the other portion 212 are connected in the sub-model 202 and whether the other portion 212 can support the current portion 204. For instance, when the current portion 204 and the other portion 212 are not connected in the sub-model 202, the other portion 212 is unable to support the current portion 204.

The 3D modelling system may use a connected component labelling technique to label all portions in the sub-model 202 with a "connected component identifier." In the example shown in FIG. 2, the 3D modelling system determines three components in the sub-model 202 and labels the three components: component A, component B, and component C respectively.

The 3D modelling system performs a connectivity check, using the component identifiers for the current portion 204 and the other portion 212, to determine whether the current portion 204 is connected to the other portion 212 in the sub-model 202. For example, the 3D modelling system determines that the current portion 204 has a component identifier of "C" and the other portion 212 has a component identifier of "C" and that the two component identifiers are the same identifier. When the 3D modelling system determines that the component identifiers for the two portions are the same, the 3D modelling system determines that the two portions are part of the same component and labels the current portion 204 as supported.

FIG. 2B shows two examples in which the 3D modelling system labels a portion as unsupported. For instance, the 3D modelling system selects a second portion 214 as a current portion for analysis and generates a second cone 216 downward from the second portion 214 within the sub-model 202. The 3D modelling system determines that the second cone 216 intersects with a third portion 218 of the sub-model 202.

The 3D modelling system analyzes the second portion 214 and the third portion 218 to determine component identifiers for the two portions. For instance, the 3D modelling system determines that the second portion 214 has a component identifier of "B" and the third portion 218 has a component identifier of "A." The 3D modelling system determines that since the component identifiers are different, a component that includes the second portion 214 is not the same as a component that includes the third portion 218 and that the component that includes the third portion 218 does not support the second portion 214. In response, the 3D modelling system labels the second portion 214 as unsupported.

For a fourth portion 220, the 3D modelling system projects a third cone 222 downward from the fourth portion 220 and in the sub-model 202 to determine whether the third cone 222 intersects with a portion of the sub-model 202 that lies below the current slice 208 that includes the fourth portion 220. When the 3D modelling system determines that the third cone 222 does not intersect with any other portions of the sub-model 202, the 3D modelling system labels the fourth portion 220 as unsupported.

In the examples described with reference to FIGS. 2A-B, the portions may be voxels, vertices, triangle polygon meshes, or any other appropriate portion of a 3D model. In some examples, the 3D modelling system may analyze pairs of voxels or vertices or portions of other sizes.

The 3D modelling system projects a cone downward from a current portion in the sub-model 202 to determine whether there is an intersection within a predetermined horizontal distance from the current portion. For instance, the use of a cone allows the 3D modelling system to analyze all horizontal directions as the same time. The 3D modelling system may use any appropriate intersection method to determine whether the cone intersects with another portion of the sub-model 202.

When the 3D modelling system determines that the cone intersects with another portion of the sub-model 202, the 3D modelling system may determine that the cone intersects with multiple other portions of the sub-model 202, such as two or three other portions. The 3D modelling system analyzes each of the other portions, in any appropriate sequence, until determining i) that one of the other portions is connected to the current portion and can support the current portion, or ii) that none of the other portions are connected to the current portion and the current portion should be labelled as unsupported.

The 3D modelling system can select a size of the sub-model based on a size of the cone projected downward from a current portion, memory limitations, whether physical for the hardware executing the 3D modelling system or determined for performance of the 3D modelling system, or both memory limitations and the size of the cone. For instance, the 3D modelling system selects the height and angle of the cone using a property of a material of the item, a property of a material of the current portion, a property of a 3D printer that will create the item, or a combination of two or more of these. The 3D modelling system can use the height of the cone to determine how many slices, from the entire 3D model of the item, to include in the sub-model 202.

The example shown in FIGS. 2A-B includes the model 200 with two pieces that are connected in another area of the model. For instance, the model 200 is a two-dimensional view of a portion of a 3D model and does not indicate how the two pieces are connected in another area of the 3D model, e.g., above, behind, or in front of the view of the model 200.

Figure 3A:
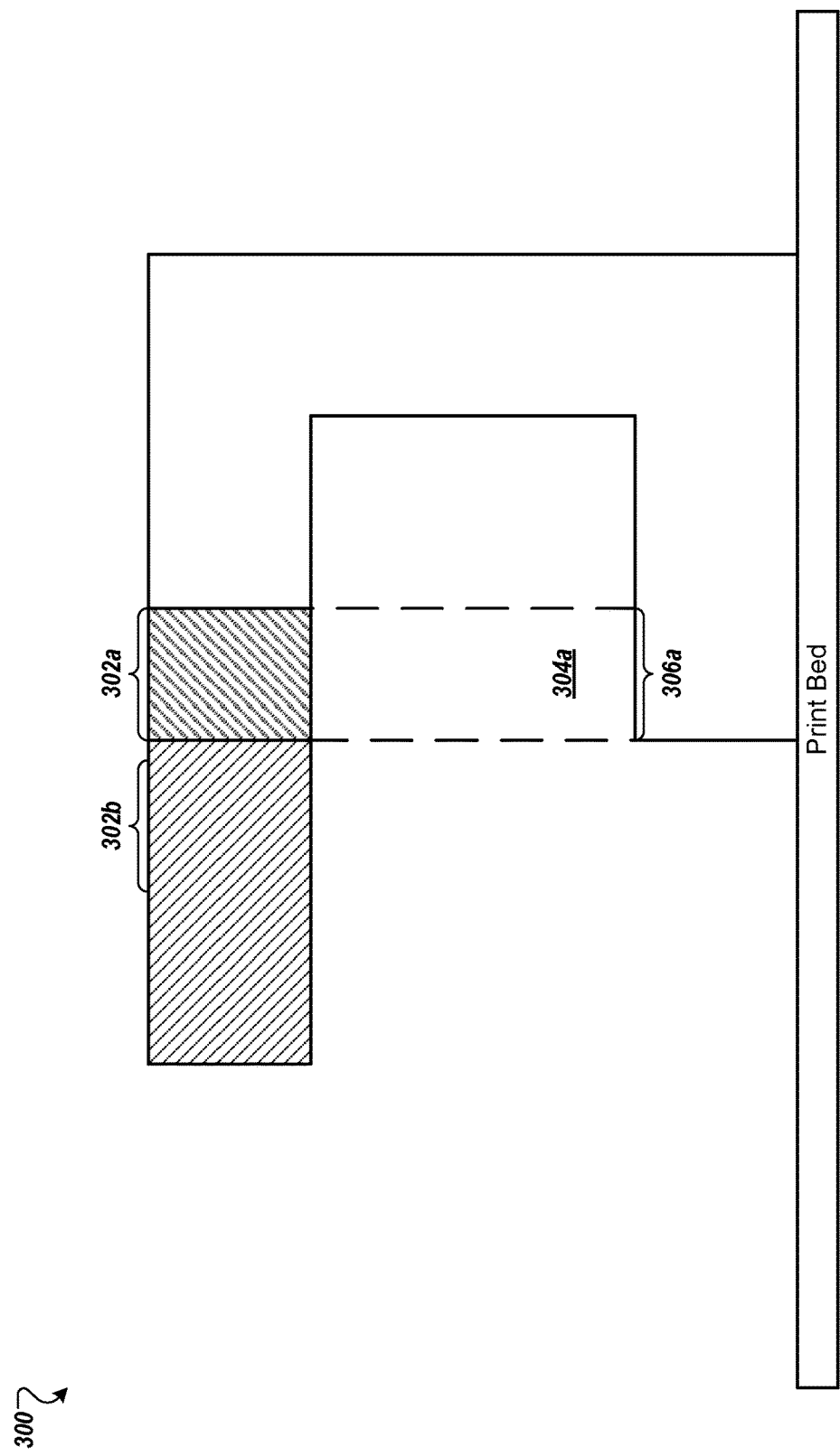
FIGS. 3A-C are an example of a model of an item for use by a three-dimensional (3D) modelling system to label portions as portions at which to generate supports.
Figure 3B:
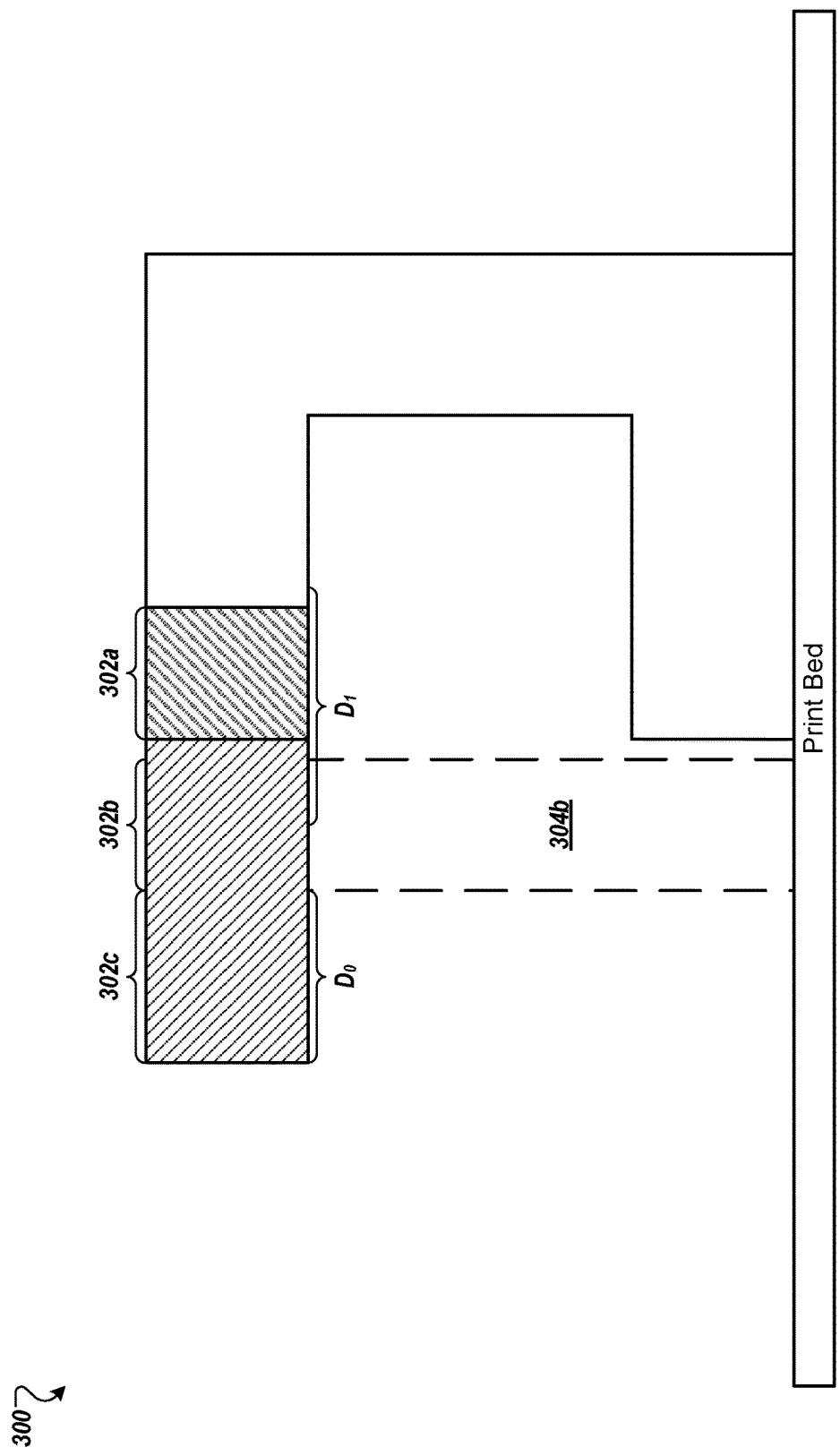
Figure 3C:
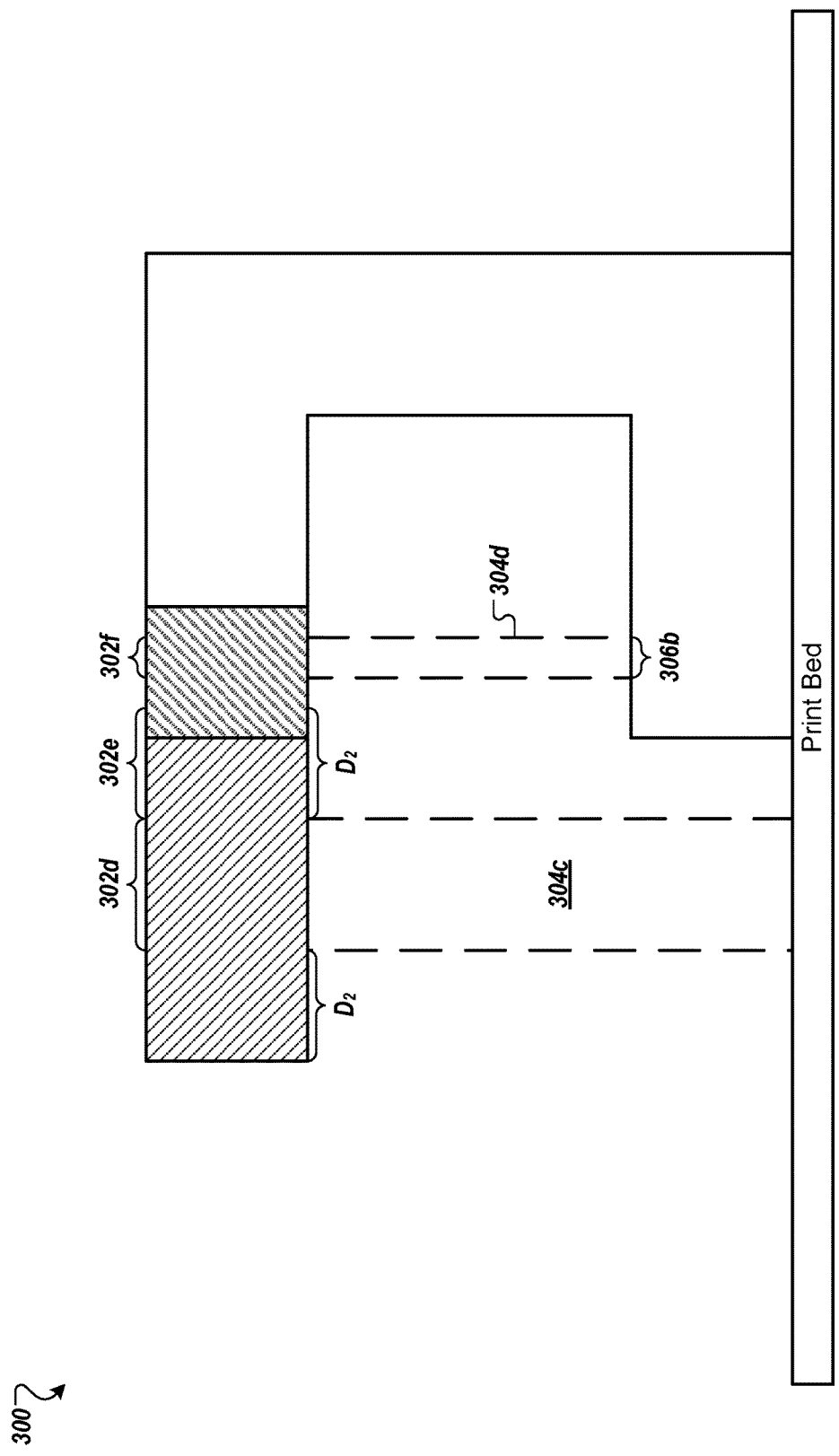

FIGS. 3A-C are an example of a model 300 of an item for use by a three-dimensional (3D) modelling system to label portions as portions at which to generate supports. For instance, the 3D modelling system may use the portions labelled as unsupported, as described with reference to FIGS. 2A-B, to determine at which of the unsupported portions supports should be generated. The 3D modelling system may generate the supports in the 3D model and a 3D printer may create the supports, using the 3D model, when printing the item.

For instance, the 3D modelling system may perform an iterative process in which the 3D modelling system analyzes unsupported portions 302a-b to determine whether a support 304a for one of the unsupported portions 302a-b would intersect with another portion 306a of the model 300. When the 3D modelling system determines that a support 304a for a first unsupported portion 302a intersections with another portion 306a of the model 300, as shown in FIG. 3A, the 3D modelling system skips the first unsupported portion 302a. For example, the 3D modelling system determines that there may be a better position in the model 300 at which to generate a support for the first unsupported portion 302a and that a second unsupported portion 302b of the model 300 should be analyzed before determining that a support must be placed below the first unsupported portion 302a.

As shown in FIG. 3B, the 3D modelling system may next analyze the second unsupported portion 302b to determine whether a second support 304b for the second unsupported portion 302b comes into contact with another portion of the model 300. When the 3D modelling system determines that a support positioned below the second unsupported portion 302b does not come into contact with another portion of the model 300, the 3D modelling system labels the second unsupported portion 302b as a portion at which to generate a support, e.g., for a support generation system described in more detail below, and labels the second portion 302b as supported.

When the 3D modelling system labels the second portion 302b as a portion at which to generate a support, the 3D modelling system may label other portions within a predetermined distance D of the second portion 302b as supported. For instance, the 3D modelling system may use a first predetermined distance $D_0$ from an edge of the second support 304b to determine that a third unsupported portion 302c should be labelled as supported. The 3D modelling system uses the first predetermined distance $D_0$ in all horizontal directions from the edges of the second support 304b to determine other portions that should be labelled as supported.

The 3D modelling system may use a second predetermined distance $D_1$, centered on the second portion 302b, to determine that the first unsupported portion 302a should be labelled as supported. The 3D modelling system labels all other portions in a circle, centered on second portion 302b, as supported with the circle having a radius equal to the second predetermined distance $D_1$. The 3D modelling system may use any appropriate algorithm to determine portions around a particular portion labelled as a portion at which to generate a support that should be labelled as supported, e.g., based on the support which will be placed at the particular portion.

In some implementations, as shown in FIG. 3C, the 3D modelling system may determine that multiple supports should be generated for the model 300, e.g., a different area of the model 300 than that shown in FIGS. 3A-B, including a third support 304c that does not intersect with the model 300 and a fourth support 304d that intersects with the model 300. For instance, the 3D modelling system may determine that the third support 304c for a fourth unsupported portion 302d would not intersect with the model 300 and label the fourth portion 302d as a portion at which to generate a support and label the fourth portion 302d as supported. The 3D modelling system uses a predetermined distance D2 to determine that a fifth portion 302e should be labelled as supported based on the support which will be generated for the fourth portion 302d.

The 3D modelling system continues the iterative process, analyzing the other portions for which the 3D modelling system has not labelled the portion as supported, until all of the portions are labelled as supported. The 3D modelling system does not analyze portions that were initially labelled as unsupported, such as the fifth portion 302e, when the portion is labelled as supported during analysis of a different portion, e.g., the fourth portion 302d.

Once the 3D modelling system has determined all of the portions at which to generate supports that will not intersect with the model 300, the 3D modelling system determines whether there are any remaining unsupported portions for which a support will intersect with the model 300. For instance, the 3D modelling system determines that a sixth portion 302f is unsupported and that the fourth support 304d for the sixth portion 302f would intersect with another portion 306b of the model 300. The 3D modelling system may determine that the placement of the fourth support 304d would support any remaining portions of the model 300 and label the sixth portion 302f and the remaining portions as supported. The 3D modelling system labels the sixth portion 302f as a portion at which to generate a support.

Figure 4:
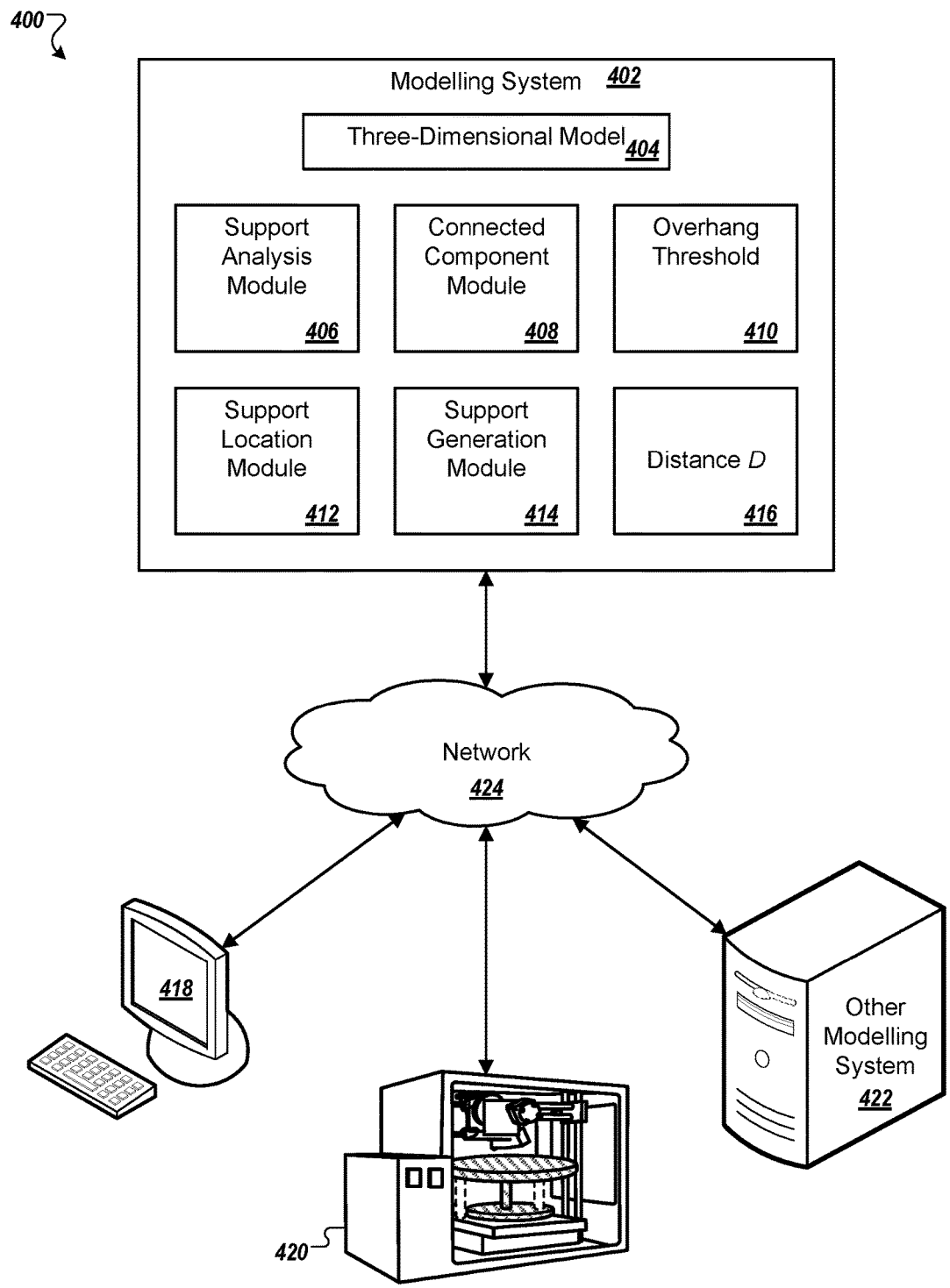
FIG. 4 shows an example of an environment in which a modelling system determines portions in a three-dimensional (3D) model of an item at which to generate supports.

FIG. 4 shows an example of an environment 400 in which a modelling system 402 determines portions in a three-dimensional (3D) model 404 of an item at which to generate supports. The modelling system 402 may receive, as input, e.g., from a user device 418, the 3D model 404, e.g., of an item to be printed. The 3D model 404 may include voxels, vertices, a triangle polygon mesh, or any other appropriate type of 3D data.

The modelling system 402 may provide, as output, an updated 3D model 404 to a 3D printer 420, e.g., to cause the 3D printer 420 to create an item represented by the 3D model 404. In some examples, the modelling system 402 may determine that at least a threshold number of supports for the 3D model 404 intersect with another portion of the 3D model and the 3D model 404 should be provided to another modelling system 422. The modelling system 402 provides the 3D model 404 to the other modelling system 422 to cause the other modelling system 422 to analyze the 3D model 404 and determine where to place supports for the item represented by the 3D model 404 as described in more detail below.

The modelling system 402 provides the 3D model 404 to a support analysis module 406. The support analysis module 406 analyzes all portions of the 3D model 404, e.g., all vertices, all vertexes, or all triangle polygon meshes, to determine which portions are supported by another portion of the 3D model 404 and which portions are not supported by another portion of the 3D model 404. The support analysis module 406 may determine that all portions in a bottom most layer of the 3D model 404 are supported, e.g., by a print bed included in the 3D printer 420 that will generate the item.

The support analysis module 406 analyzes the portions in each of the layers beginning with a layer that is second from the bottom of the 3D model 404 to determine whether the portion in the current layer is supported by another portion in the layer below the current layer. The support analysis module 406 may analyze the portions in a current layer of the 3D model 404 using any appropriate algorithm. For instance, the support analysis module 406 may begin at a "northwestern" most portion in the 3D model 404 and analyze portions in the current layer by moving in an "easterly" direction.

The support analysis module 406 labels each of the analyzed portions as "supported" or "unsupported." For instance, when the support analysis module 406 determines that a current portion of a current layer is directly above a portion of a lower layer, which is connected to and below the current layer, the support analysis module 406 labels the current portion as "supported."

The support analysis module 406 may use an object, such as the cone described with reference to FIGS. 2A-B, to determine whether a current portions is supported. The support analysis module 406 may use any appropriate object, such as a sphere or an ellipsoid.

When the support analysis module 406 determines that a projection of the object below the current portion does not intersect with another portion of the 3D model 404, the support analysis module 406 labels the current portion as "unsupported." The support analysis module 406 may include data, as part of the 3D model 404 or as separate data, that identifies each of the portions of the 3D model 404 and whether the portion is labelled as supported or unsupported. For instance, the modelling system 402 may include a database with a record for each portion of the 3D model 404. The record may indicate whether the corresponding portion is supported or unsupported.

The support analysis module 406 may use a connected component module 408 to determine whether a current portion is connected with another portion in the 3D model 404 when the projection of the object below the current portion intersects with another portion. For instance, the support analysis module 406 may project the object downward, in the 3D model 404 or a sub-model of the 3D model 404, and determine whether the object intersects with another portion of the 3D model 404. When the object intersects with another portion of the 3D model 404, the support analysis module 406 may provide data that identifies the current portion and the other portion to the connected component module 408. The connected component module 408 determines object identifiers for each of the portions, the current portion and the other portion, as described in more detail above. When the object identifiers for each of the portions are the same, the connected component module 408 determines that the portions are connected. The support analysis module 406 receives data indicating that the portions are connected and labels the current portion as supported.

When the object identifiers for each of the portions are different, the connected component module 408 determines that the current portion is not connected to the other portion. The support analysis module 406 receives data indicating that the portions are connected and labels the current portion as unsupported.

In some implementations, the support analysis module 406 may use an overhang threshold 410 when determining whether a current portion is supported by another portion in the 3D model 404. The support analysis module 406 uses the overhang threshold to determine a distance within which the current portion must be from the other portion so that the other portion can support the current portion. For example, when the support analysis module 406 projects a circular object downward from the current portion, the support analysis module 406 may generate the circular object with a radius equal to the overhang threshold 410.

The modelling system 402, or a component of the modelling system 402, may determine the overhang threshold 410 using a property of the item represented by the 3D model 404, e.g., a material used to create the item, a material used to create the current portion, a property of the 3D printer 420 that will create the item, or a combination of two or more of these. For instance, the modelling system 402 may use a larger overhang threshold for an item created from a metal and a smaller overhang threshold for an item created from a plastic.

The support analysis module 406 may determine a height of the object projected downward from the current portion based on properties of the item represented by the 3D model 404, properties of the current portion, a property of the 3D printer that will create the item, memory requirements, or a combination of two or more of these. For instance, the support analysis module 406 may determine a height of a slice, e.g., layer, that will be printed by the 3D printer 420. The support analysis module 406 may use the height of the slice as the height of the object to limit a size of a sub-model used to determine whether portions of a current layer are supported or unsupported by some of a layer immediately beneath the current layer without any intervening layers. The support analysis module 406 may use any appropriate number of layers in the sub-model, e.g., two or more layers in the sub-model.

As the support analysis module 406 analyzes the different layers in the 3D model 404, the data used for a sub-model changes. For instance, when the support analysis module 406 analyzes a layer that is second from the bottom, the support analysis module 406 may use a 3D sub-model that includes only the layer that is second from the bottom and the bottom layer of the 3D model 404. When the support analysis module 406 moves to the next layer that is third from the bottom, the support analysis module 406 may use a 3D sub-model that includes data from the third from the bottom layer, e.g., as a current layer, and the second from the bottom layer.

The modelling system 402 provides, to a support location module 412, data representing the 3D model 404 and data representing which portions of the 3D model are supported and which are unsupported. For instance, the modelling system 402 may provide the support location module 412 with a pointer to the 3D model 404 and a pointer to a database that includes records for each of the portions of the 3D model 404 that indicate whether the corresponding portion is supported or unsupported.

The support location module 412 uses the 3D model 404 and the labels that indicate which portions or the 3D model are supported and which portions are unsupported to determine which portions to label as portions at which to generate supports. For instance, the support location module 412 may use any appropriate support generation algorithm, support intersection algorithm, or both, to determine whether a support for a current portion labeled as unsupported would intersect with another portion of the 3D model 404.

When the support location module 412 determines that a support for the current portion would not intersect with another portion of the 3D model 404, the support location module 412 labels the current portion as a portion at which a support generation module 414 should generate a support. For example, the support location module 412 may update a record for the current portion in the database to indicate that the current portion is a portion at which to generate a support.

The support location module 412 may determine all portions within a predetermined distance D 416 of the current portion that will be supported by a support for the current portion. The support location module 412 may label all of the portions within the predetermined distance D 416 as supported, e.g., by the support for the current portion. The data indicating that a portion is supported may indicate how the portion is supported, e.g., by a support or by another portion of the 3D model 404.

In some examples, the support location module 412 may store data identifying a print bed location at which a bottom of the support will be placed. For instance, the support location module 412 may update the record for the current portion to indicate the location of the print bed at which the bottom of the support will be placed.

When the support location module 412 determines that a support for the current portion would intersect with another portion of the 3D model 404, the support location module 412 skips the current portion. The support location module 412 may label the current portion as a portion at which a support will intersect with another portion of the 3D model 404. In some examples, the support may intersect with two or more other portions of the 3D model 404. In these examples, the support location module 412 may store data that indicates the number of portions with which a support for the current portion may intersect, e.g., in the database record for the current portion.

The support location module 412 does not change the "supportedness" label for the current portion when a support for the current portion would intersect with another portion of the 3D model 404. For example, the support location module 412 does not change the label of "unsupported" for the current portion.

The support location module 412 may analyze each portion originally labeled as unsupported by the support analysis module 406 or a subset of the portions originally labeled as unsupported by the support analysis module 406. For instance, when the support location module 412 determines that a support for a current portion will not intersect with another portion of the 3D model 404, the support location module 412 may determine that an adjacent portion, next to the current portion and in the same layer as the current portion, is labelled as unsupported. The support location module 412 uses the distance D 416 to determine that the adjacent portion would be supported by a support for the current portion and that the adjacent portion should be labeled as supported. In response, the support location module 412 does not analyze the adjacent portion to determine whether a support specific to the adjacent portion would intersect with another portion of the 3D model 404.

After the support location module 412 determines locations for supports that will not intersect with another portion of the 3D model 404 and the only portions which are labelled as unsupported would have supports that intersect with at least one other portion of the 3D model 404, the support location module 412 analyzes the remaining portions that are labeled as unsupported. For instance, the support location module 412 determines where supports should be located for the portions that are labeled as a portion for which a support would intersect with another portion of the 3D model 404. The support location module 412 labels at least some of the remaining portions as portions at which a support should be generated.

The support generation module 414 receives the 3D model 404 and the data indicating the labels that identify at which portions to generate supports. The support generation module 414 generates, in the 3D model 404, supports for the portions labeled as portions at which to generate supports. The support generation module 414 may use any appropriate algorithm to generate the supports.

The support generation module 414 may determine a size of a support, a shape of a support, or both, based on a property of the item represented by the 3D model 404, a property of the 3D printer 420, e.g., a printing method used by the 3D printer 420, or another appropriate factor. For instance, the support generation module 414 may accept, as input, a material used to generate the current portion for which a support is being generated. The support generation module 414 uses the material to determine a width of the support, a material for the support, a shape for the support, or a combination of two or more of these. Some support shapes may include a tree or another structure with branching. The support generation module 414 updates the 3D model 404 with data for the support.

In some implementations, when the support generation module 414 generates, for a current portion, a support that will intersect with another portion of the 3D model 404, the support generation module 414 determines locations at which the support will intersect with the 3D model 404 and a quantity of the locations. The support generation module 414 determines whether the types of intersections and the quantity of the locations satisfy a threshold and, using a result of this determination, whether a support for the current location should contact a print bed of the 3D printer 420. For instance, the support generation module 414 determines whether there are enough intersections for the support such that the support can be held in-place with the other portions of the 3D model 404 with which the support is intersecting, instead of a different end-point, e.g., on the print bed, which might cause more surface damage than required when the support is removed.

The support generation module 414 may determine, for a first support of a current portion, that an entire cross section of the first support will contact another portion of the 3D model 404. For instance, the support generation module 414 determines that an entire horizontal cross section of the first support will contact the other portion of the 3D model 404 and that the first support should not contact the print bed of the 3D printer 420. The support generation module 414 generates, in the 3D model 404, data representing the first support positioned between the current portion and the other portion and not extending beyond either of the current portion or the other portion.

The support generation module 414 may determine, for a second support of a second current portion, that the second support touches a small section of a second other portion. The support generation module 414 determines that the intersection of the second support with the second other portion does not satisfy the threshold, e.g., the second other portion would not be able to hold the weight of the second support and the second current portion when the item is printed by the 3D printer 420, and that the second support should contact the print bed. The support generation module 414 generates data for the second support in the 3D model 404 that indicates that the second support will be between the second current portion and the print bed and will contact the second other portion. The support generation module 414 may use data from the database identifying the location on the print bed with which the second support will intersect or may determine the location on the print bed with which the second support will intersect using any other appropriate method.

When the support generation module 414 determines, for a third support of a third current portion, that the third support will contact at least a threshold number of third other portions of the 3D model 404, at least a threshold amount, or both, the support generation module 414 does not generate the third support such that the third support will contact the print bed of the printer 420. For instance, when the support generation module 414 determines that the third support would contact four other portions of the 3D model 404 and contact with three of the four other portions would sufficiently maintain the third support and the third current portion, the support generation module 414 generates data for the third support such that the third support contacts the third current portion and the three of the four other portions and does not contact the fourth other portion or the print bed. For example, the support generation module 414 terminates the third support after the third of the three other portions so that the third support is between the third current portion and the third of the three other portions.

Once the support generation module 414 updates the 3D model 404 with data for the supports for the portions labeled as portions at which to generate supports, the modelling system 402 provides the 3D model 404 to the 3D printer 420. When the modelling system 402 sends the 3D model 404, with data representing supports that will be removed after creation of the item, to the 3D printer 420, the modelling system 402 causes the 3D printer 420 to create the item using the 3D model 404. For instance, the 3D printer 420 uses the 3D model 404, and other data for the item, to determine materials for creation of the item and uses the materials to create the time.

In some implementations, the support location module 412 may determine that at least a threshold number of supports will intersect with other portions of the 3D model 404 and that the other modelling system 422 should determine locations at which supports should be generated. For instance, as the support location module 412 determines whether a remaining location should be a location at which to generate a support when the support will intersect with another portion of the 3D model 404, after determining locations of all supports that will not intersect with the 3D model 404, the support location module 412 determines whether a current number of supports for the 3D model 404 that intersect with other portions of the 3D model 404 satisfies a threshold value. When the support location module 412 determines that the current number of supports for the 3D model 404 that intersect with other portions of the model satisfies the threshold value, the modelling system 402 provides the 3D model 404 to the other modelling system 422.

In some implementations, the 3D printer 420 may include the modelling system 402. For instance, the 3D printer 420 may store data representing the 3D model 404, data representing the overhang threshold 410, and data representing the distance D 416 in memory, either the same memory or different memories. The 3D printer 420 may include software code for the support analysis module 406, the connected component module 408, the support location module 412, the support generation module 414, or a combination of two or more of these.

For example, the user device 418 may include a software application that creates the 3D model 404. The user device 418 provides a portion of the 3D model 404, e.g., the entire 3D model 404 or a subset of the 3D model 404, to the 3D printer 420. When the 3D printer 420 receives a portion of the 3D model, the 3D printer 420 analyzes the portion of the 3D model 404 to determine which portions of the 3D model are unsupported and where to place supports for those portions. Once the 3D printer 420 determines where to place supports for the unsupported portions, the 3D printer 420 may generate the item represented by the 3D model 404 using the 3D model 404 and data that indicates where to place supports for the unsupported portions of the 3D model 404.

The 3D printer 420 may determine a size of a scan zone, and of the object projected from a current portion in a current layer, using the memory limitations of the 3D printer 420. For instance, the 3D printer 420 may determine that a random access memory included in the 3D printer 420 allows the 3D printer 420 to use a scan zone that includes the current layer and two layers immediately below the current layer and does not include additional storage for another layer of the 3D model 404 in memory.

A network 424, such as a local area network (LAN), wide area network (WAN), the Internet, or a combination thereof, connects the modelling system 402, the user device 418, the 3D printer 420, and the other modelling system 422. In some examples, the network 424 may include a local area network that connects the modelling system 402 and the 3D printer 420 and a wide area network that connects the modelling system 402 and the user device 418.

Figure 5A:
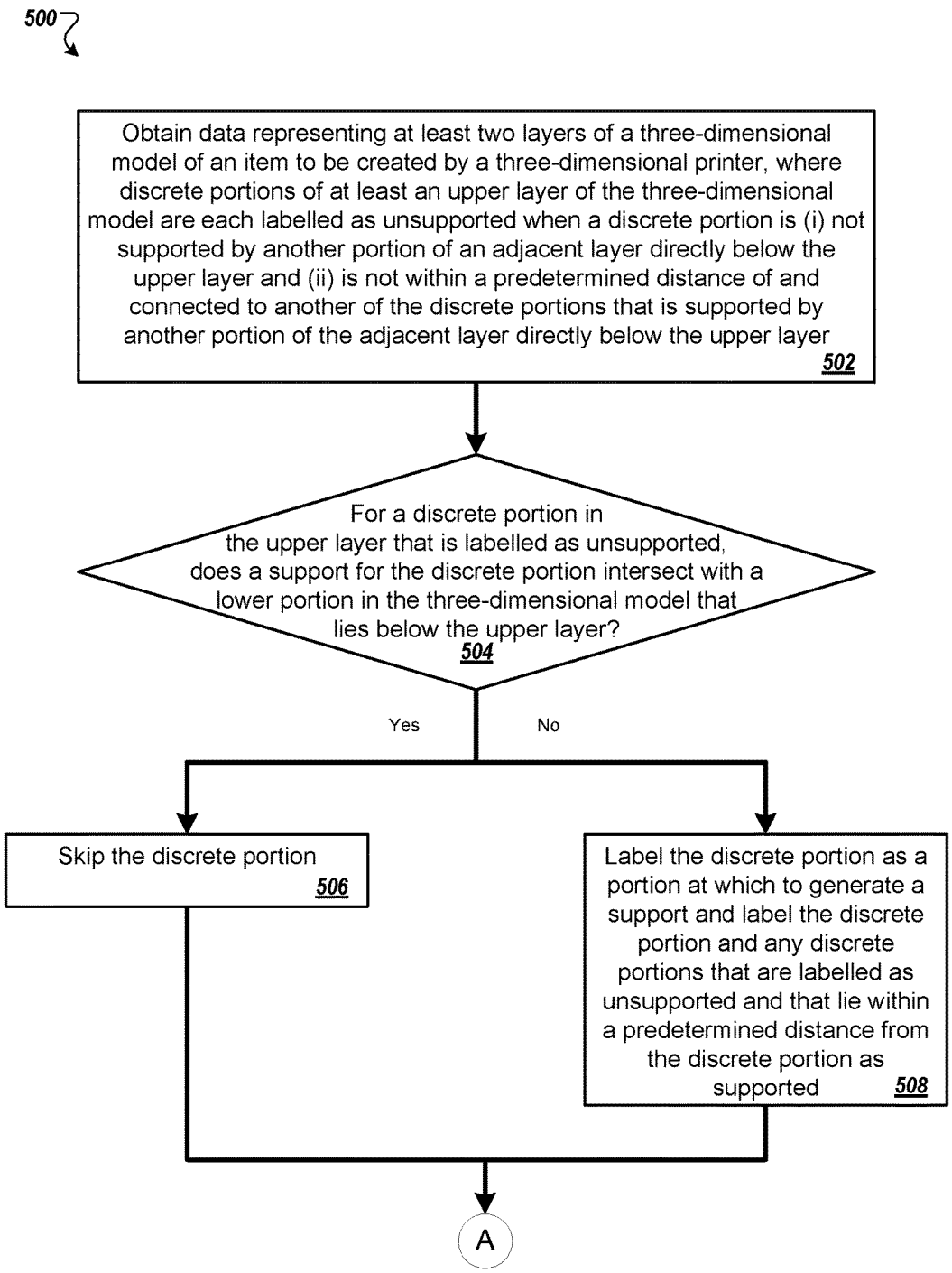
FIGS. 5A-B are a flow diagram of a process for generating supports in a three-dimensional (3D) model.
Figure 5B:
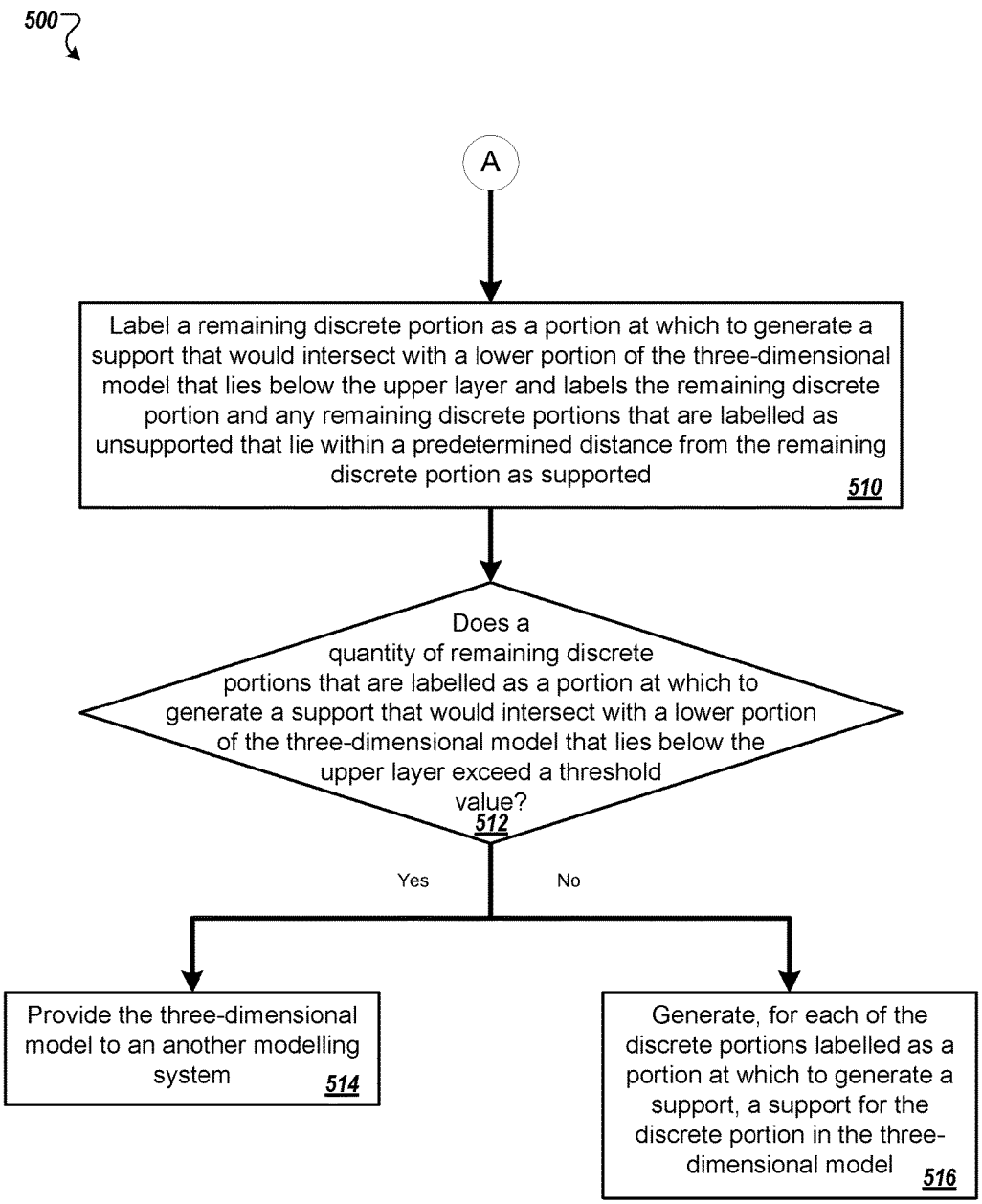

FIGS. 5A-B are a flow diagram of a process 500 for generating supports in a three-dimensional (3D) model. For example, the process 500 can be used by the modelling system 402 from the environment 400.

A modelling system obtains data representing at least two layers of a three-dimensional model of an item to be created by a three-dimensional printer, where discrete portions of at least an upper layer of the three-dimensional model are each labelled as unsupported when a discrete portion is (i) not supported by another portion of an adjacent layer directly below the upper layer and (ii) is not within a predetermined distance of and connected to another of the discrete portions that is supported by another portion of the adjacent layer directly below the upper layer (502). For example, the modelling system may obtain a 3D model of the item. The modelling system may receive data that indicates, for each portion of the model, whether the portion is supported or unsupported.

The modelling system determines, for a discrete portion in the upper layer that is labelled as unsupported, whether a support for the discrete portion would intersect with a lower portion in the three-dimensional model that lies below the upper layer (504). The modelling system may use any appropriate support generation method, any appropriate support intersection method, or both, to determine whether the support for the discrete portion would intersect with a lower portion in the 3D model.

When the modelling system determines that the support for the discrete portion would intersect with the lower portion, the modelling system skips the discrete portion (506). For instance, the modelling system labels the portion as a portion for which a support would intersect with another portion of the 3D model.

When the modelling system determines that the support for the discrete portion would not intersect with a lower portion, the modelling system labels the discrete portion as a portion at which to generate a support and labels the discrete portion and any discrete portions that are labelled as unsupported and that lie within a predetermined distance from the discrete portion as supported (508). The modelling system may label the discrete portion by adding or updating data in the 3D model. In some examples, the modelling system may store data separate from the 3D model that indicates that the discrete portion is supported, that the discrete portion is a portion at which to generate a support, that the other discrete portions within the predetermined distance from the discrete portion are supported, or a combination of two or more of these.

The modelling system may processes data representing the discrete portions of the upper layer of the three-dimensional model that are labelled as unsupported to place supports for at least some of the discrete portions that are labelled as unsupported. The modelling system may process the data representing the discrete portions that were labelled as unsupported until each of the discrete portions is labelled as supported or until the modelling system determines that each of the remaining discrete portions that are labelled as unsupported are locations for which a support would intersect with another portion of the 3D model. For instance, the modelling system may repeat at least some of steps 504 through 508 for different discrete portions of the 3D model until the modelling system determines that each of the remaining discrete portions that are labelled as unsupported are locations for which a support would intersect with another portion of the 3D model.

The modelling system labels a remaining discrete portion as a portion at which to generate a support that would intersect with a lower portion of the three-dimensional model that lies below the upper layer and labels the remaining discrete portion and any remaining discrete portions that are labelled as unsupported that lie within a predetermined distance from the remaining discrete portion as supported (510). In some examples, the modelling system may label the remaining discrete portion as a portion at which to generate a support. For instance, the data indicating that a support should be generated at the remaining discrete portion may not indicate that the support will intersect with the lower portion of the 3D model.

The modelling system determines whether a quantity of remaining discrete portions that are labelled as a portion at which to generate a support that would intersect with a lower portion of the three-dimensional model that lies below the upper layer exceeds a threshold value (512). When the modelling system determines that the quantity of remaining discrete portions that are labelled as a portion at which to generate a support that would intersect with a lower portion of the three-dimensional model that lies below the upper layer exceeds the threshold value, the modelling system provides the three-dimensional model to an another modelling system (514).

For example, the modelling system processes data representing at least some of the remaining discrete portions of the upper layer of the three-dimensional model that are labelled as unsupported and for which a support for the remaining discrete portion would intersect with a lower portion in the three-dimensional model that lies below the upper layer to place supports for at least some of the remaining discrete portions that are labelled as unsupported. The modelling system processes at least some of the remaining discrete portions until determining that all of the remaining discrete portions are supported or that the threshold value has been exceeded. When the modelling system determines that the threshold value has been exceeded, the modelling system provides the 3D model to another modelling system and stops processing the 3D model. When the modelling system determines that all remaining discrete portions are supported and that the threshold has not been exceeded, the modelling system proceeds to step 516.

When the modelling system determines that the quantity of remaining discrete portions that are labelled as a portion at which to generate a support that would intersect with a lower portion of the three-dimensional model that lies below the upper layer does not exceed the threshold value, the modelling system generates, for each of the discrete portions labelled as a portion at which to generate a support, a support for the discrete portion in the three-dimensional model (516). The modelling system may generate, in the 3D model, all supports that will not intersect with a lower portion of the 3D model and generate, in the 3D model, supports or portions of supports for the supports that will intersect with a lower portion of the 3D model.

For instance, the modelling system may determine, for a particular support that will intersect with a lower portion in the 3D model, a quantity of lower portions with which the support will intersect, a type of intersection for each of the lower portions with which the support will intersect, or both. The modelling system may use the quantity of lower portions, the types of intersection, or both, to determine whether the support should contact both a respective portion for which the support is being generated, e.g., a current portion, and a print bed of a printer generating the item using the 3D model or only the respective portion for which the support is being generated, as described in more detail above.

In some implementations, the process 500 can include additional steps, fewer steps, or some of the steps can be divided into multiple steps. For example, the modelling system may not generate the supports, e.g., may not perform step 516. In some examples, the modelling system may perform one or more steps of a process 600, described below, to determine whether a discrete portion of the 3D model should be labelled as supported or as unsupported as part of the process 500.

Figure 6:
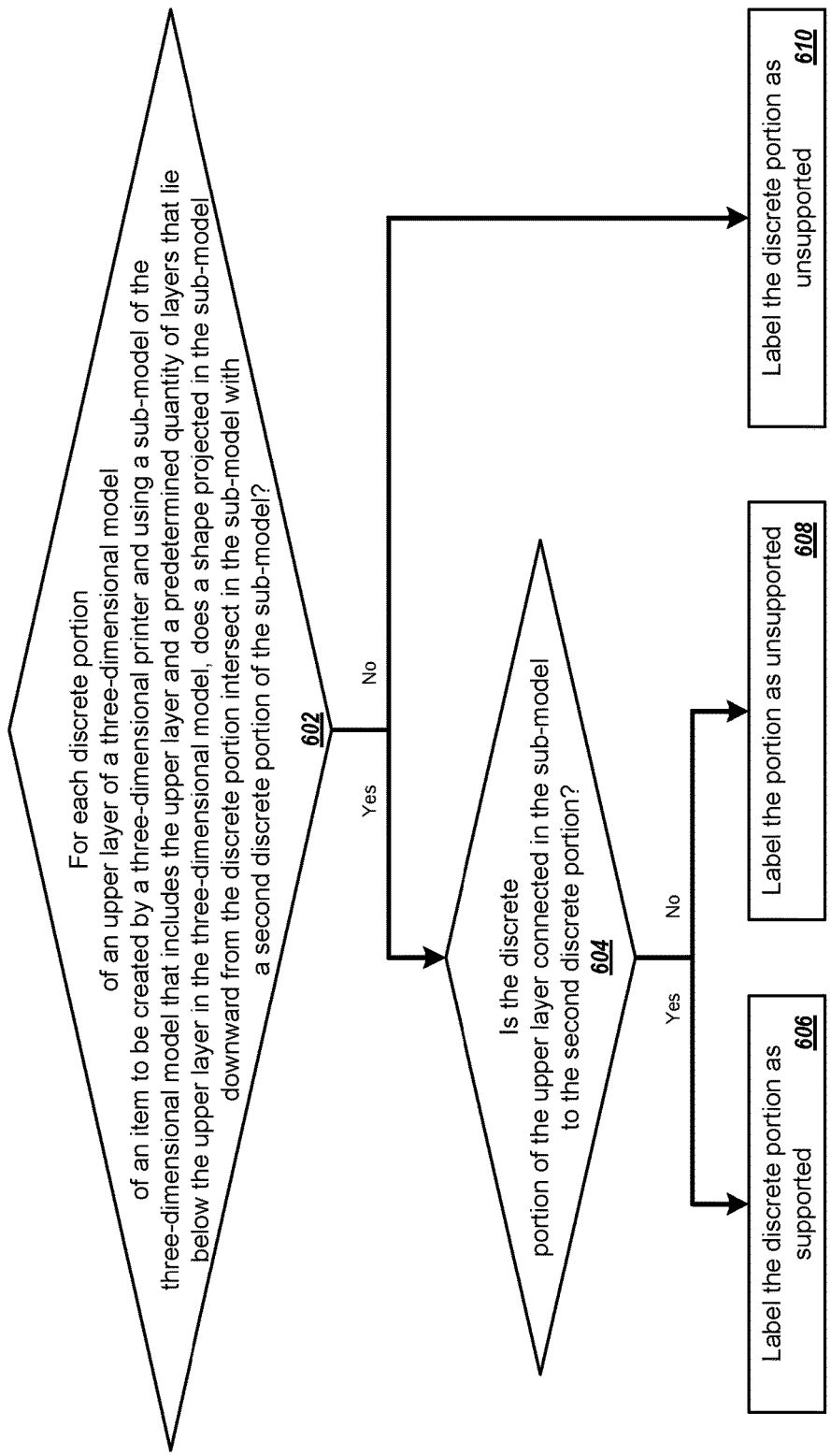
FIG. 6 is a flow diagram of a process for labelling discrete portions of a three-dimensional (3D) model as unsupported.

FIG. 6 is a flow diagram of a process 600 for labelling discrete portions of a three-dimensional (3D) model as unsupported. For example, the process 600 can be used by the modelling system 402 from the environment 400.

A modelling system determines, for each discrete portion of an upper layer of a three-dimensional model of an item to be created by a three-dimensional printer and using a sub-model of the three-dimensional model that includes the upper layer and a predetermined quantity of layers that lie below the upper layer in the three-dimensional model, whether a shape projected in the sub-model downward from the discrete portion would intersect in the sub-model with a second discrete portion of the sub-model, wherein the three-dimensional model includes at least two layers (602). For instance, the modelling system projects a 3D cone downward from the discrete portion and in the sub-model.

When the modelling system determines that the shape intersects with the second discrete portion, the modelling system determines, using the sub-model, whether the discrete portion of the upper layer is connected in the sub-model to the second discrete portion (604). For example, the modelling system may use the sub-model of the scan zone to determine a two-dimensional (2D) image of the sub-model. The modelling system includes, in the 2D image, an entire cross section of the sub-model that intersects with the discrete portion of the upper layer and the second discrete portion with which the shape intersects. The modelling system labels each of the distinct objects in the 2D image of the sub-model, e.g., with an alpha numeric identifier. The modelling system uses the labels for each of the distinct objects to determine whether the discrete portion of the upper layer and the second discrete portion are included in the same object from the two-dimensional image, e.g., have the same label.

When the modelling system determines that the discrete portion of the upper layer is connected in the sub-model to the second discrete portion, the modelling system labels the discrete portion as supported (606). When the modelling system determines that the discrete portion of the upper layer and the second discrete portion are included in the same object from the 2D image, the modelling system labels the discrete portion as supported. For instance, the modelling system updates a database to indicate that the discrete portion is supported.

When the modelling system determines that the discrete portion of the upper layer is not connected in the sub-model to the second discrete portion, the modelling system labels the portion as unsupported (608). When the modelling system determines that the discrete portion of the upper layer and the second discrete portion are not included in the same object from the two-dimensional image, the modelling system labels the discrete portion as unsupported. For instance, the modelling system updates a database to indicate that the discrete portion is unsupported.

When the modelling system determines that the shape does not intersect with the second discrete portion, the modelling system labels the discrete portion as unsupported (610). For example, the modelling system determines that there is not a lower portion of the 3D model directly below, and connected to, the discrete portion and that a lower portion is not within a predetermined distance which would allow the lower portion to support the discrete portion.

In some implementations, the process 600 can include additional steps, fewer steps, or some of the steps can be divided into multiple steps. For example, the modelling system may perform one or more of the steps of the process 500 as part of the process 600. For instance, the modelling system may perform steps 504 through 508 as part of the process 600.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 7:
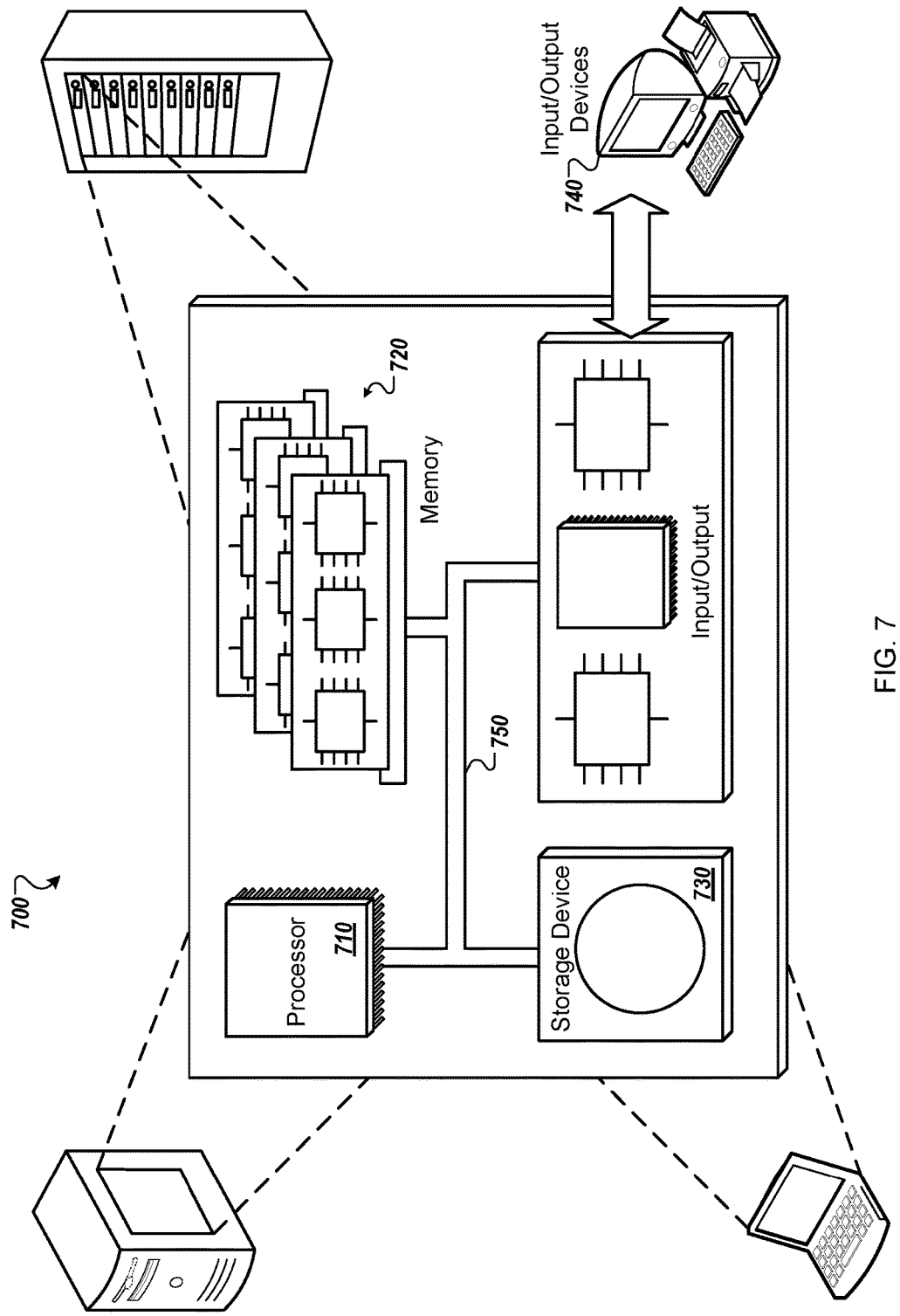
FIG. 7 is a block diagram of a computing system that can be used in connection with computer-implemented methods described in this document.

An example of one such type of computer is shown in FIG. 7, which shows a schematic diagram of a generic computer system 700. The system 700 can be used for the operations described in association with any of the computer-implemented methods described previously, according to some implementations. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In some implementations, the processor 710 is a single-threaded processor. In other implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In other implementations, the memory 720 is a non-volatile memory unit.

The storage device 730 is capable of providing mass storage for the system 700. In some implementations, the storage device 730 is a computer-readable medium. In various different implementations, the storage device 730 may be a floppy disk device, a hard disk device, an optical disk device, or a tape device.

The input/output device 740 provides input/output operations for the system 700. In some implementations, the input/output device 740 includes a keyboard and/or pointing device. In other implementations, the input/output device 740 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
obtaining data representing at least two layers of a three-dimensional model of an item to be created by a three-dimensional printer, wherein discrete portions of at least an upper layer of the three-dimensional model are each labelled as unsupported when a discrete portion is (i) not supported by another portion of an adjacent layer directly below the upper layer and (ii) is not within a predetermined distance of and connected to another of the discrete portions that is supported by another portion of the adjacent layer directly below the upper layer;

processing data representing the discrete portions of the upper layer of the three-dimensional model that are labelled as unsupported to place supports for at least some of the discrete portions that are labelled as unsupported, the processing to place supports comprising:

determining, for a discrete portion in the upper layer that is labelled as unsupported, whether a support for the discrete portion would intersect with a lower portion in the three-dimensional model that lies below the upper layer, when the support for the discrete portion would intersect, skipping the discrete portion, and when the support for the discrete portion would not intersect, labelling the discrete portion as a portion at which to generate a support and labelling the discrete portion and any discrete portions that are labelled as unsupported and that lie within a predetermined distance from the discrete portion as supported;

processing data representing any remaining discrete portions of the upper layer of the three-dimensional model that are labelled as unsupported and for which a support for the remaining discrete portion would intersect with a lower portion in the three-dimensional model that lies below the upper layer to place additional supports for at least some of the remaining discrete portions that are labelled as unsupported, the processing to place additional supports comprising:

labelling a remaining discrete portion as a portion at which to generate a support that would intersect with a lower portion of the three-dimensional model that lies below the upper layer and labelling the remaining discrete portion and any remaining discrete portions that are labelled as unsupported that lie within a predetermined distance from the remaining discrete portion as supported, determining whether a quantity of remaining discrete portions that are labelled as a portion at which to generate a support that would intersect with a lower portion of the three-dimensional model that lies below the upper layer exceeds a threshold value, and when the quantity of remaining discrete portions that are labelled as a portion at which to generate a support that would intersect with a lower portion of the three-dimensional model that lies below the upper layer exceeds the threshold value, providing the three-dimensional model to an another modelling system to cause the other modelling system to generate supports for portions of the three-dimensional model and provide the three-dimensional model to a three-dimensional printer; and when the quantity of remaining discrete portions that are labelled as a portion at which to generate a support that would intersect with a lower portion of the three-dimensional model that lies below the upper layer does not exceed the threshold value:

generating, for each of the discrete portions labelled as a portion at which to generate a support, a support for the discrete portion in the three-dimensional model, and providing the three-dimensional model to the three-dimensional printer in response to generating, for each of the discrete portions labelled as a portion at which to generate a support, the support for the discrete portion in the three-dimensional model, the three-dimensional model for use by the three-dimensional printer in three-dimensional printing an object represented by the three-dimensional model.

2. The method of claim 1, comprising:
selecting a width for the supports using at least one of a material of the item or a three-dimensional printer that will create the item using the three-dimensional model.

3. The method of claim 1, comprising:
selecting the predetermined distance for a circle centered on a particular discrete portion within which any discrete portions that are labelled as unsupported will be labeled as supported when the discrete portion is labelled as supported.

4. The method of claim 1, wherein labelling the discrete portion as a portion at which to generate a support comprises labelling a portion of a print bed in the three-dimensional model as a portion at which to generate the support.

5. The method of claim 1, comprising, for each upper layer in the three-dimensional model:

determining, for each discrete portion of the upper layer and using a sub-model of the three-dimensional model that includes the upper layer and a predetermined quantity of layers that lie below the upper layer in the three-dimensional model, whether a shape projected in the sub-model downward from the discrete portion would intersect in the sub-model with a second discrete portion of the sub-model;

for each discrete portion of the upper layer for which the shape is determined to intersect in the sub-model with the second discrete portion:

determining, using the sub-model, whether the discrete portion of the upper layer is connected in the sub-model to the second discrete portion;

in response to determining that the discrete portion of the upper layer is connected in the sub-model to the second discrete portion, labelling the discrete portion as supported; or in response to determining that the discrete portion of the upper layer is not connected in the sub-model to the second discrete portion, labelling the portion as unsupported; and for each discrete portion of the upper layer for which the shape is determined not to intersect in the sub-model with the second discrete portion:

labelling the discrete portion as unsupported.

6. The method of claim 5, wherein determining, for each discrete portion of the upper layer and using the sub-model of the three-dimensional model that includes the upper layer and the predetermined quantity of layers that lie below the upper layer in the three-dimensional model, whether the shape projected in the sub-model downward from the discrete portion would intersect in the sub-model with the second discrete portion of the sub-model comprises determining, for each discrete portion of the upper layer and using the sub-model of the three-dimensional model that includes the upper layer and the predetermined quantity of layers that lie below the upper layer in the three-dimensional model, whether a cone projected in the sub-model downward from the discrete portion would intersect in the sub-model with the second discrete portion of the sub-model.

7. The method of claim 6, wherein determining, for each discrete portion of the upper layer and using the sub-model of the three-dimensional model that includes the upper layer and the predetermined quantity of layers that lie below the upper layer in the three-dimensional model, whether the cone projected in the sub-model downward from the discrete portion would intersect in the sub-model with the second discrete portion of the sub-model comprises determining, for each discrete portion of the upper layer and using the sub-model of the three-dimensional model that includes the upper layer and the predetermined quantity of layers that lie below the upper layer in the three-dimensional model, whether the cone with a predetermined angle and a predetermined height projected in the sub-model downward from the discrete portion would intersect in the sub-model with the second discrete portion of the sub-model, at least one of the predetermined angle or the predetermined height selected based on at least one of a material to be used to create the item using a three-dimensional printing process, a material to be used to create the discrete portion of the item using the three-dimensional printing process, or a three-dimensional printer that will create the item using the three-dimensional model.

8. The method of claim 5, wherein determining, for each discrete portion of the upper layer and using the sub-model of the three-dimensional model that includes the upper layer and the predetermined quantity of layers that lie below the upper layer in the three-dimensional model, whether the shape projected in the sub-model downward from the discrete portion would intersect in the sub-model with the second discrete portion of the sub-model comprises determining, for each voxel or each vertex of the upper layer and using the sub-model of the three-dimensional model that includes the upper layer and the predetermined quantity of layers that lie below the upper layer in the three-dimensional model, whether the shape projected in the sub-model downward from the voxel or the vertex would intersect in the sub-model with a second voxel or a second vertex in the sub-model, each layer in the three-dimensional model comprising (i) one or more voxels or (ii) one or more vertices.

9. The method of claim 5, wherein determining, for each discrete portion of the upper layer and using the sub-model of the three-dimensional model that includes the upper layer and the predetermined quantity of layers that lie below the upper layer in the three-dimensional model, whether the shape projected in the sub-model downward from the discrete portion would intersect in the sub-model with the second discrete portion of the sub-model comprises determining, for each discrete portion of the upper layer and using a sub-model of the three-dimensional model that includes only the upper layer and a single layer in the three-dimensional model that lies below the upper layer and not additional layers, whether the shape projected in the sub-model downward from the discrete portion would intersect in the sub-model with the second discrete portion of the sub-model.

10. The method of claim 5, wherein determining, using the sub-model, whether the discrete portion of the upper layer is connected in the sub-model to the second discrete portion comprises determining, using only the sub-model, whether the discrete portion of the upper layer is connected in the sub-model to the second discrete portion.

11. The method of claim 5, wherein:
determining, using the sub-model, whether the discrete portion of the upper layer is connected in the sub-model to the second discrete portion comprises:
determining, using the sub-model, a two-dimensional image that includes i) a two-dimensional part of the upper layer, ii) a two-dimensional part of each of the predetermined quantity of layers that lie below the upper layer, iii) a two-dimensional part of the discrete portion of the upper layer, and iv) a two-dimensional part of the second discrete portion;
determining each distinct object in the two-dimensional image; and
determining whether the discrete portion of the upper layer and the second discrete portion are included in the same object from the two-dimensional image;
in response to determining that the discrete portion of the upper layer is connected in the sub-model to the second discrete portion, labelling the discrete portion as supported comprises, in response to determining that the discrete portion of the upper layer and the second discrete portion are included in the same object from the two-dimensional image, labelling the discrete portion as supported; and
in response to determining that the discrete portion of the upper layer is not connected in the sub-model to the second discrete portion, labelling the portion as unsupported comprises, in response to determining that the discrete portion of the upper layer and the second discrete portion are not included in the same object from the two-dimensional image, labelling the discrete portion as unsupported.

12. The method of claim 11, wherein determining whether the discrete portion of the upper layer and the second discrete portion are included in the same object from the two-dimensional image comprises:
labelling each object in the two-dimensional image;
determining a first label for a first object in the two-dimensional image that includes the discrete portion;
determining a second label for a second object in the two-dimensional image that includes the second discrete portion; and
determining whether the first label and the second label are the same label.

13. The method of claim 5, comprising:
projecting, for each discrete portion of the upper layer and using the sub-model of the three-dimensional model that includes the upper layer and the predetermined quantity of layers that lie below the upper layer in the three-dimensional model, the shape downward from the discrete portion in the sub-model.

14. A system comprising:
a data processing apparatus; and
a non-transitory computer readable storage medium coupled with the data processing apparatus and storing instructions executable by the data processing apparatus and upon such execution cause the data processing apparatus to perform operations comprising:
determining, for each discrete portion of an upper layer of a three-dimensional model of an item to be created by a three-dimensional printer and using a sub-model of the three-dimensional model that includes the upper layer and a predetermined quantity of layers that lie below the upper layer in the three-dimensional model, whether a shape projected in the sub-model downward from the discrete portion would intersect in the sub-model with a second discrete portion of the sub-model, wherein the three-dimensional model comprises at least two layers;
for each discrete portion of the upper layer for which the shape is determined to intersect in the sub-model with the second discrete portion:
determining, using the sub-model, whether the discrete portion of the upper layer is connected in the sub-model to the second discrete portion;

in response to determining that the discrete portion of the upper layer is connected in the sub-model to the second discrete portion, labelling the discrete portion as supported; or in response to determining that the discrete portion of the upper layer is not connected in the sub-model to the second discrete portion, labelling the discrete portion as unsupported;

for each discrete portion of the upper layer for which the shape is determined not to intersect in the sub-model with the second discrete portion:

labelling the discrete portion as unsupported;

processing data representing the discrete portions of the upper layer of the three-dimensional model that are labelled as unsupported to place supports for at least some of the discrete portions that are labelled as unsupported, the processing to place supports comprising:

determining, for a discrete portion in the upper layer that is labelled as unsupported, whether a support for the discrete portion would intersect with a lower portion in the three-dimensional model that lies below the upper layer, when the support for the discrete portion would intersect, skipping the discrete portion, and when the support for the discrete portion would not intersect, labelling the discrete portion as a portion at which to generate a support and labelling the discrete portion and any discrete portions that are labelled as unsupported and that lie within a predetermined distance from the discrete portion as supported;

processing data representing any remaining discrete portions of the upper layer of the three-dimensional model that are labelled as unsupported and for which a support for the remaining discrete portion would intersect with a lower portion in the three-dimensional model that lies below the upper layer to place additional supports for at least some of the remaining discrete portions that are labelled as unsupported, the processing to place additional supports comprising:

labelling a remaining discrete portion as a portion at which to generate a support that would intersect with a lower portion of the three-dimensional model that lies below the upper layer and labelling the remaining discrete portion and any remaining discrete portions that are labelled as unsupported that lie within a predetermined distance from the remaining discrete portion as supported, determining whether a quantity of remaining discrete portions that are labelled as a portion at which to generate a support that would intersect with a lower portion of the three-dimensional model that lies below the upper layer exceeds a threshold value, when the quantity of remaining discrete portions that are labelled as a portion at which to generate a support that would intersect with a lower portion of the three-dimensional model that lies below the upper layer exceeds the threshold value, providing the three-dimensional model to an another modelling system to cause the other modelling system to generate supports for portions of the three-dimensional model and provide the three-dimensional model to a three-dimensional printer; and when the quantity of remaining discrete portions that are labelled as a portion at which to generate a support that would intersect with a lower portion of the three-dimensional model that lies below the upper layer does not exceed the threshold value:

generating, for each of the discrete portions labelled as a portion at which to generate a support, a support for the discrete portion in the three-dimensional model, and providing the three-dimensional model to the three-dimensional printer in response to generating, for each of the discrete portions labelled as a portion at which to generate a support, the support for the discrete portion in the three-dimensional model, the three-dimensional model for use by the three-dimensional printer in three-dimensional printing an object represented by the three-dimensional model.

15. The system of claim 14, comprising:
the three-dimensional printer that receives the three-dimensional model and generates the item.

16. A non-transitory computer readable storage medium storing instructions executable by a data processing apparatus and upon such execution cause the data processing apparatus to perform operations comprising:

projecting, for each discrete portion of an upper layer of a three-dimensional model of an item to be created by a three-dimensional printer and using a sub-model of the three-dimensional model that includes the upper layer and a predetermined quantity of layers that lie below the upper layer in the three-dimensional model, a shape in the sub-model downward from the discrete portion;

determining, for each discrete portion of the upper layer, whether the shape projected in the sub-model downward from the discrete portion would overlap in the sub-model with a second discrete portion of the sub-model;

for each discrete portion of the upper layer for which the shape is determined to overlap in the sub-model with the second discrete portion:

determining, using the sub-model, whether the discrete portion of the upper layer is connected in the sub-model to the second discrete portion;

in response to determining that the discrete portion of the upper layer is connected in the sub-model to the second discrete portion, labelling the discrete portion as supported; or in response to determining that the discrete portion of the upper layer is not connected in the sub-model to the second discrete portion, labelling the discrete portion as unsupported; and for each discrete portion of the upper layer for which the shape is determined not to overlap in the sub-model with the second discrete portion:

labelling the discrete portion as unsupported; and providing data for the three-dimensional model to the three-dimensional printer, the data for use by the three-dimensional printer in three-dimensional printing an object represented by the three-dimensional model.

17. The computer readable storage medium of claim 16, comprising:

providing, to a system, the three-dimensional model and a list of the unsupported portions for support generation for the unsupported portions to cause the system to generate support data for the unsupported portions and enable the three-dimensional printer to generate the item using the three-dimensional model and the support data.

18. The computer readable storage medium of claim 16, wherein determining, for each discrete portion of the upper layer, whether the shape projected in the sub-model downward from the discrete portion would overlap in the sub-model with a second discrete portion of the sub-model comprises determining, for each discrete portion of the upper layer, whether a cone with a predetermined angle and a predetermined height projected in the sub-model downward from the discrete portion would overlap in the sub-model with the second discrete portion of the sub-model, at least one of the predetermined angle or the predetermined height selected based on at least one of a material to be used to create the item using a three-dimensional printing process, a material to be used to create the discrete portion of the item using the three-dimensional printing process, or a three-dimensional printer that will create the item using the three-dimensional model.

19. The computer readable storage medium of claim 16, wherein determining, using the sub-model, whether the discrete portion of the upper layer is connected in the sub-model to the second discrete portion comprises determining, using only the sub-model, whether the discrete portion of the upper layer is connected in the sub-model to the second discrete portion, wherein the three-dimensional model includes at least one layer that is not included in the sub-model.

20. A computer-implemented method comprising:
  obtaining data representing at least two layers of a three-dimensional model of an item to be created by a three-dimensional printer, wherein discrete portions of at least an upper layer of the three-dimensional model are each labelled as unsupported when a discrete portion is (i) not supported by another portion of an adjacent layer directly below the upper layer and (ii) is not within a predetermined distance of and connected to another of the discrete portions that is supported by another portion of the adjacent layer directly below the upper layer;
  processing data representing the discrete portions of the upper layer of the three-dimensional model that are labelled as unsupported to place supports for at least some of the discrete portions that are labelled as unsupported, the processing to place supports comprising:
    determining, for a discrete portion in the upper layer that is labelled as unsupported, whether a support for the discrete portion would intersect with a lower portion in the three-dimensional model that lies below the upper layer,
    when the support for the discrete portion would intersect, skipping the discrete portion, and
    when the support for the discrete portion would not intersect, labelling the discrete portion as a portion at which to generate a support and labelling the discrete portion and any discrete portions that are labelled as unsupported and that lie within a predetermined distance from the discrete portion as supported;
  processing data representing any remaining discrete portions of the upper layer of the three-dimensional model that are labelled as unsupported and for which a support for the remaining discrete portion would intersect with a lower portion in the three-dimensional model that lies below the upper layer to place additional supports for at least some of the remaining discrete portions that are labelled as unsupported, the processing to place additional supports comprising:
    labelling a remaining discrete portion as a portion at which to generate a support that would intersect with a lower portion of the three-dimensional model that lies below the upper layer and labelling the remaining discrete portion and any remaining discrete portions that are labelled as unsupported that lie within a predetermined distance from the remaining discrete portion as supported;
  generating, for each of the discrete portions labelled as a portion at which to generate a support for which the support would not intersect with a lower portion of the three-dimensional model, a support for the discrete portion in the three-dimensional model;
  determining, for each of the discrete portions labelled as a portion at which to generate a support for which the support would intersect with a lower portion of the three-dimensional model, whether an intersection with the three-dimensional model for the support satisfies an intersection threshold;
  for each discrete portion for which an intersection with the three-dimensional model for the support satisfies the intersection threshold, generating, for the discrete portion, a support in the three-dimensional model between the discrete portion and a portion in the three-dimensional model with which the support intersects without generating the support to contact a print bed;
  for each discrete portion for which an intersection with the three-dimensional model for the support does not satisfy the intersection threshold, generating, for the discrete portion, a support in the three-dimensional model between the discrete portion and the print bed; and
  providing the three-dimensional model to the three-dimensional printer in response to generating, for each of the discrete portions labelled as a portion at which to generate a support, the support for the discrete portion in the three-dimensional model, the three-dimensional model for use by the three-dimensional printer in three-dimensional printing an object represented by the three-dimensional model.

* * * * *

UNITED STATES PATENT AND TRADEMARK OFFICE
CERTIFICATE OF CORRECTION

PATENT NO.         : 10,061,303 B2
APPLICATION NO.    : 15/157794
DATED              : August 28, 2018
INVENTOR(S)        : Naimin Koh and Murali Pappoppula Page 1 of 1

It is certified that error appears in the above-identified patent and that said Letters Patent is hereby corrected as shown below:

On the Title Page

At item (73) Assignee: Delete "Autodesk Inc." and insert --Autodesk, Inc.--, therefor.

Signed and Sealed this
Sixteenth Day of October, 2018

Andrei Iancu
*Director of the United States Patent and Trademark Office*